(12) United States Patent
Okigami

(10) Patent No.: US 7,792,601 B2
(45) Date of Patent: Sep. 7, 2010

(54) CONTROL APPARATUS, CONTROL METHOD FOR CONTROL APPARATUS, MULTI-FUNCTIONAL APPARATUS, MULTI-FUNCTIONAL APPARATUS CONTROL SYSTEM, CONTROL PROGRAM, AND COMPUTER-READABLE STORAGE MEDIUM

(75) Inventor: Masafumi Okigami, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 592 days.

(21) Appl. No.: 11/880,682

(22) Filed: Jul. 24, 2007

(65) Prior Publication Data

US 2008/0027569 A1    Jan. 31, 2008

(30) Foreign Application Priority Data

Jul. 25, 2006    (JP)    .............................. 2006-202331

(51) Int. Cl.
  *G06F 19/00*    (2006.01)
(52) U.S. Cl. ........................................ 700/100; 700/83
(58) Field of Classification Search ................... 700/83, 700/17, 169, 174, 100–102; 726/4, 32, 20, 726/206; 356/402, 1.13, 1.16
  See application file for complete search history.

(56) References Cited

U.S. PATENT DOCUMENTS

| | | | |
|---|---|---|---|
| 6,067,168 A | 5/2000 | Nishiyama et al. | |
| 6,141,112 A | 10/2000 | Nishiyama et al. | |
| 6,400,465 B1 | 6/2002 | Nishiyama et al. | |
| 7,219,231 B2 * | 5/2007 | Cossel et al. | ................. 713/168 |
| 2003/0145220 A1 * | 7/2003 | Cossel et al. | ................. 713/200 |
| 2004/0003095 A1 * | 1/2004 | Gitany-Alonso | ............ 709/228 |

(Continued)

FOREIGN PATENT DOCUMENTS

JP    09-233253 A    9/1997

(Continued)

OTHER PUBLICATIONS

Sharp Corporation, "*digital color multi-functional apparatus . . .*"; [online]; (search: Apr. 4, 2006); Internet "URL;http://www.sharp.co.jp/products/mx4501fn/text/function.html".

(Continued)

*Primary Examiner*—Kidest Bahta
(74) *Attorney, Agent, or Firm*—Edwards Angell Palmer & Dodge LLP; David G. Conlin, Esq.; David A. Tucker, Esq.

(57) ABSTRACT

A control apparatus comprises: a job processing section for acquiring, on input of selection application information into a multi-functional apparatus, setting condition corresponding to the selection application information from the multi-functional apparatus, and carrying out predetermined data processing corresponding to the setting condition; a job result transmission section for outputting to the multi-functional apparatus a process result given by the job processing section; and a display switch-over determining section for controlling the multi-functional apparatus to enable the multi-functional apparatus to accept input of a user ID and selection application information from another user during the data processing by the job processing section. In this way, the present invention realizes a multi-functional apparatus control system capable of accepting a job from a user when another user is using the application program.

15 Claims, 23 Drawing Sheets

U.S. PATENT DOCUMENTS

| | | | |
|---|---|---|---|
| 2005/0094195 A1* | 5/2005 | Sakamoto et al. | 358/1.15 |
| 2005/0275885 A1* | 12/2005 | Sugiyama | 358/1.15 |
| 2006/0086788 A1 | 4/2006 | Zhang et al. | |
| 2006/0256370 A1* | 11/2006 | Murakawa | 358/1.15 |
| 2006/0268304 A1* | 11/2006 | Tanaka et al. | 358/1.13 |
| 2006/0287962 A1 | 12/2006 | Oosawa | |
| 2008/0066164 A1* | 3/2008 | Chebolu et al. | 726/4 |

FOREIGN PATENT DOCUMENTS

| | | |
|---|---|---|
| JP | 10-111793 | 4/1998 |
| JP | 2000-298561 | 10/2000 |
| JP | 2001-024826 | 1/2001 |
| JP | 2005-173768 A | 6/2005 |
| JP | 2006-127503 | 5/2006 |

OTHER PUBLICATIONS

Hisasi Kobayasi; *"Launch of a digital full-color multi-functional apparatus 12 model for business use by Sharp Corporation . . . "*; [online]; Nov. 24, 2005; ascii 24.com, (search: Apr. 4, 2006), Internet "URL:http://ascii24.com/news/i/hard/article/2005/11/24/659226-000.html".

\* cited by examiner

FIG. 6

| JOB ID | USER ID |
|--------|---------|
| JOB 01 | A001 |
|        |         |

FIG. 8

| JOB ID | USER ID | LOGIN INFORMATION |
|---|---|---|
| JOB 01 | A001 | Yes |
| JOB 02 | B001 | No |

FIG. 9

| THE FIRST API FROM OSA APPLICATION LAYER | THE SECOND API OPENED BY SERVICE LAYER (IN CALLING ORDER) | | | |
|---|---|---|---|---|
| | FIRST | SECOND | THIRD | FOURTH |
| ExecuteCopy | Do Scan | Do Print | | |
| ExecuteScan | Do Scan | SaveFile | SendByFTP | |
| ExecuteFAX | Do Scan | SaveFile | SendByLine | |
| ExecutePrint | SaveFile | DoPrint | | |
| ... | ... | ... | ... | ... |

FIG. 12
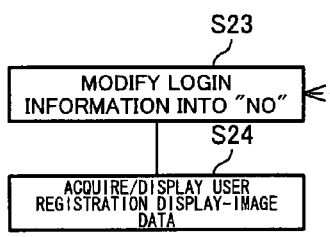
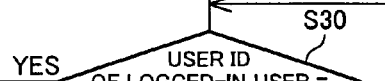
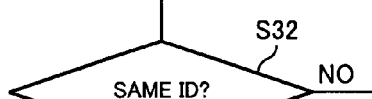
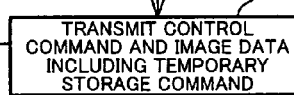

CONTROL APPARATUS, CONTROL METHOD FOR CONTROL APPARATUS, MULTI-FUNCTIONAL APPARATUS, MULTI-FUNCTIONAL APPARATUS CONTROL SYSTEM, CONTROL PROGRAM, AND COMPUTER-READABLE STORAGE MEDIUM

This Nonprovisional application claims priority under 35 U.S.C. §119(a) on Patent Application No. 2006/202331 filed in Japan on Jul. 25, 2006, the entire contents of which are hereby incorporated by reference.

FIELD OF THE INVENTION

The present invention relates to a multi-functional apparatus control system in which a multi-functional apparatus and a control apparatus for controlling the multi-functional apparatus are connected via a network.

BACKGROUND OF THE INVENTION

A multi-functional apparatus is conventionally well-known. Its various functions includes photocopying, scanning, printing, and facsimile transmission/reception. In recent years, such a multi-functional apparatus is connected to a PC (personal computer) via a communication network and carries out further various kinds of processing.

The applicant of the present invention has suggested a system based on SOAP (Simple Object Access Protocol) in which the functions of applications which operate on a PC and the function of a multi-functional apparatus are associated with each other, so that the multi-functional apparatus operates as a part of the total application system. This system realizes a flexible service in which the function of the multi-functional apparatus and the function of the PC are appropriately combined.

Further, Japanese Unexamined Patent Publication "Tokukai 2000-298561 (published on Oct. 24, 2000)" discloses a technique of storing a customized program file with an operator ID number into a file server. In this case, the multi-functional apparatus identifies the ID number of the user, and downloads a program file corresponding to the ID number from the file server.

However, the technique of Japanese Unexamined Patent Publication "Tokukai 2000-298561 (published on Oct. 24, 2000)" has restriction such that a single user can use a single program file among the files stored in the file server; that is, this technique does not assume a case where a plurality of users use the same program file.

Further, it is well-known that data processing takes a while depending on the type of program file or data, but the technique of Japanese Unexamined Patent Publication "Tokukai 2000-298561 (published on Oct. 24, 2000)" does not allow a user to use the multi-functional apparatus when another user uses a program file in the same multi-functional apparatus.

SUMMARY OF THE INVENTION

An object of the present invention is to provide a multi-functional apparatus control system allowing a user to start a job when another user is using an application program.

A control apparatus according to the present invention is a control apparatus configured to communicate with a multi-functional apparatus and control the multi-functional apparatus, comprising: data processing means for acquiring, on input of a job execution instruction into the multi-functional apparatus, a process request corresponding to the job execution instruction from the multi-functional apparatus, and carrying out predetermined data processing corresponding to the process request; process result outputting means for outputting to the multi-functional apparatus a process result given by the data processing means; and controlling means for controlling the multi-functional apparatus to enable the multi-functional apparatus to accept a job execution instruction from another user during the data processing by the data processing means.

Further, a control method for control apparatus according to the present invention is a control method for a control apparatus configured to communicate with a multi-functional apparatus and control the multi-functional apparatus, the control method comprising: by data processing means, acquiring, on input of a job execution instruction into the multi-functional apparatus, a process request corresponding to the job execution instruction from the multi-functional apparatus, and carrying out predetermined data processing corresponding to the process request; by process result outputting means, outputting to the multi-functional apparatus a process result given by the data processing means; and by controlling means, controlling the multi-functional apparatus to enable the multi-functional apparatus to accept a job execution instruction from another user during the data processing by the data processing means.

Further, the multi-functional apparatus according to the present invention is a multi-functional apparatus connected to a control apparatus via a communication line, the multi-functional apparatus comprising: process request outputting means for outputting, on input of a job execution instruction, a process request corresponding to the job execution instruction to the control apparatus; and image outputting means for acquiring a process result of the data processing corresponding to the process request from the control apparatus and carrying out image output corresponding to the process result.

Further, a multi-functional apparatus control system according to the present invention includes the control apparatus and the multi-functional apparatus.

With this arrangement, the controlling means of the control apparatus controls the multi-functional apparatus to enable the multi-functional apparatus to accept a job execution instruction from another user in the course of the data processing by the control apparatus. Therefore, the multi-functional apparatus can accept a job execution instruction from a different user in the course of the data processing by the control apparatus. More specifically, the foregoing arrangement allows a user to input a job execution instruction to the multi-functional apparatus to start the job even when another user uses an application program of the control apparatus. Consequently, even when the job of the application program instructed by the previous user takes a while, the next user does not have to wait until the data processing is completed. This improves user convenience.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 6 is a drawing showing an example of a job management table managed by a job management section of a control apparatus according to First Embodiment of the present invention.

FIG. 8 is a drawing showing an example of user management table managed by the multi-functional apparatus according to First Embodiment of the present invention.

FIG. 9 is a drawing showing an example of command conversion table in an open I/F layer.

FIG. 12 is a flow chart showing an operation flow in the case of "Yes" in the steps S11 to 13 of FIG. 11.

DESCRIPTION OF THE EMBODIMENTS

First Embodiment

The following explains one embodiment of the present invention with reference to FIG. 1 to FIG. 16. More specifically, the following describes a multi-functional apparatus control system according to one embodiment of the present invention. FIG. 2 is a drawing showing a schematic structure of the multi-functional apparatus control system according to the present embodiment.

As shown in FIG. 2, the multi-functional apparatus control system according to the present embodiment includes a multi-functional apparatus 1, and a control apparatus 2, which are connected via a communication network. This multi-functional apparatus control system may of course include a plurality of multi-functional apparatuses 1, and a plurality of control apparatuses 2.

Examples of communication network through which the multi-functional apparatus 1 and the control apparatus 2 are connected include Internet, telephone line, serial cable, and other wire/wireless communications.

In the present embodiment, the multi-functional apparatus 1 carries out a process associated with a process of an application program executed by the control apparatus 2 (cooperation process, hereinafter). For example, the multi-functional apparatus 1 transmits scanned image data to the control apparatus 2. In the control apparatus 2, the program execution section according to an English-Japanese (from English into Japanese) automatic translation application program extracts characters from the image data, and executes English-Japanese translation with respect to the extracted characters. After that, the multi-functional apparatus 1 carry out printing of an image including the Japanese resulted from the translation. The multi-functional apparatus 1 transmits scanned image data to the control apparatus 2 thus carry out a cooperation process.

To carry out cooperation process, the process time of control apparatus 2 may increase.

The multi-functional apparatus control system according to the present embodiment is configured to accept the next cooperation process even in this case.

The structures of the multi-functional apparatus 1 and the control apparatus 2 are explained below.

(Hardware Structure of Multi-Functional Apparatus)

The multi-functional apparatus 1 is a device in which a plurality of functions, including scanning (image-scanning function), printing (image-forming function), image data transmission (communication function), and image conversion, and printer, photocopier, facsimile machine, scanner, and an arithmetic unit for carrying out, image transfer, image conversion/processing (MFP: multi-function printer), are combined together. Note that, the multi-functional apparatus 1 is not required to include all of these functions. For example, the multi-functional apparatus 1 may include only the scanning function (image-scanning function) and the communication function, or may include only the printing function (image-forming function) and the communication function.

Figure 3:
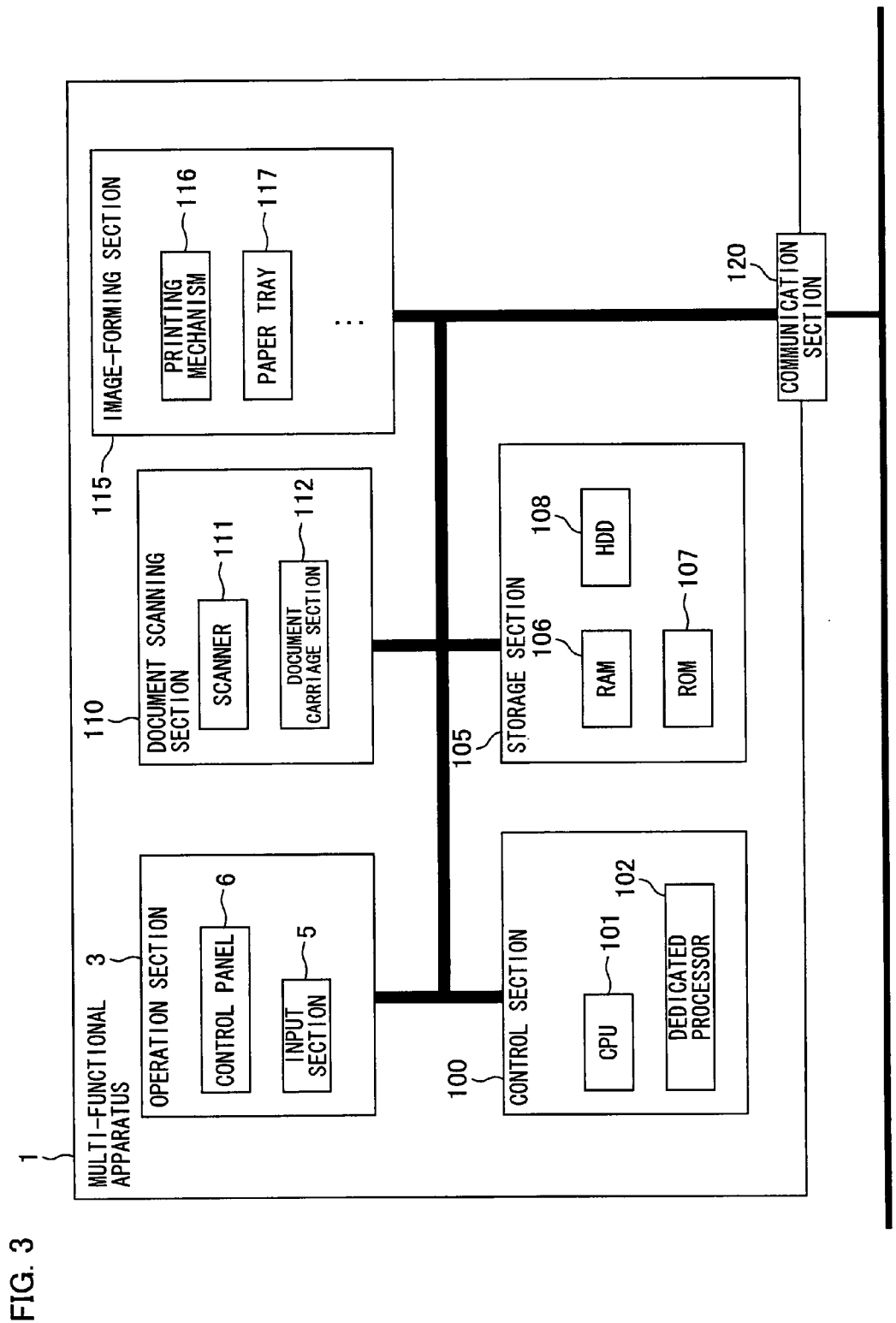
FIG. 3 is a block diagram showing a hardware structure of a multi-functional apparatus, according to one embodiment of the present invention.

FIG. 3 is a block diagram showing a hardware structure of the multi-functional apparatus 1. As shown in FIG. 3, the multi-functional apparatus 1 includes an operation section 3, a document scanning section 110, an image-forming section (image outputting means) 115, a control section 100, a storage section 105, and a communication section 120, which are connected to each other by a data bus.

The operation section 3 serves to accept data input from a user, and includes a control panel 6 and an input section 5 (described later). The operation section 3 receives a user ID (user identification information) for identifying the user, for example. The document scanning section 110 includes a scanner 111 and a document carriage section 112, and serves to scan text or image printed on the document as image data.

The image-forming section 115, which includes a printing mechanism 116 and a paper tray 117, serves to print an image (text/photo/graphic) corresponding to input image data on a sheet (paper etc.). The communication section 120 serves as an interface for carrying out communication (incl. facsimile transmission/reception) with an external device such as the control apparatus 2.

The control section 100 includes a CPU 101 and a dedicated processor 102. The storage section 105 includes a RAM 106, a ROM 107, and a HDD 108.

In the multi-functional apparatus 1, the CPU 101 of the control section 100 executes various programs stored in the storage section 105 so as to carry out various functions. More specifically, the CPU 101 executes a control program for the document scanning section 110 so as to carry out a document scanning process. Further, the CPU 101 executes a control program for the image-forming section 115 to carry out an image-forming (printing) process. The CPU 101 also executes a control program for the communication section 120 to carry out a communication process, such as data transmission/reception.

Figure 4:
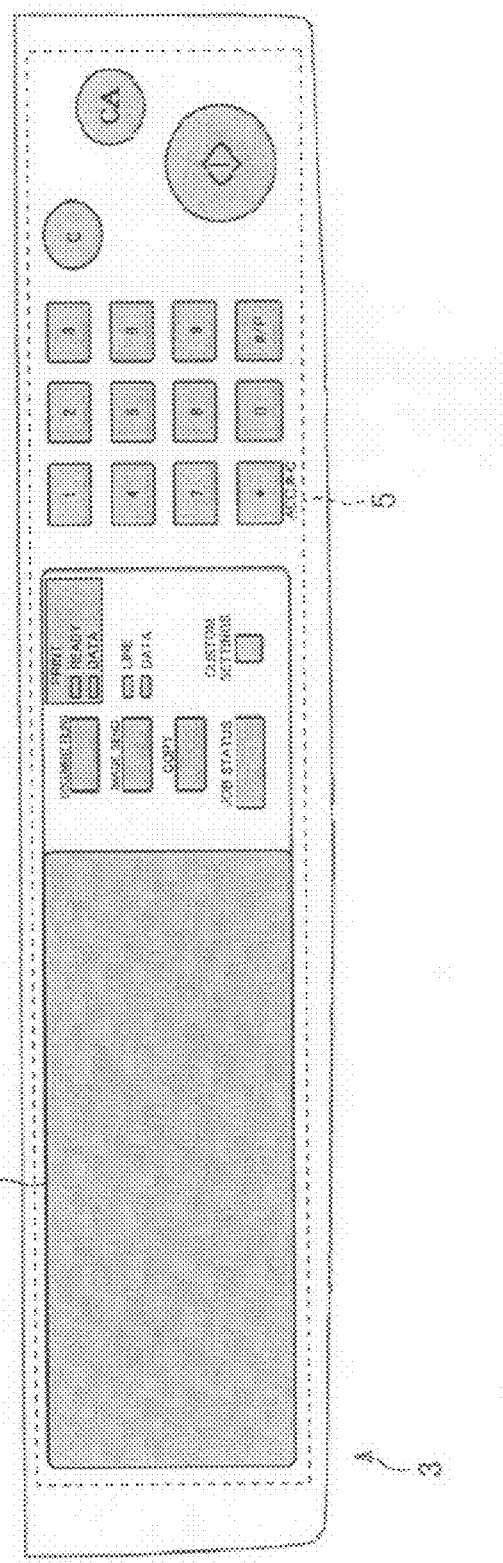
FIG. 4 is a plan view of an operation section of a multi-functional apparatus, according to one embodiment of the present invention.

FIG. 4 is a magnified view of the operation section 3 of the multi-functional apparatus 1. As shown in FIG. 4, the operation section 3 includes a control panel (display section) 6 for displaying an operation display-image to the user, and an input section 5 for accepting user input. Note that, the control panel 6 is constituted of a touch panel system, and also serves as an input section 5.

The multi-functional apparatus 1 may be connected to an UI device instead of having the operation section 3, or the UI device may also serve as the operation section 3.

In this case, the UI device connected to the multi-functional apparatus 1 displays the operation display-image.

Further, the multi-functional apparatus 1 may be connected to an IC card information reading device for reading a user ID from an IC card, or to a biological identification information reading device for reading biological identification information, such as fingerprint, retina etc. and identifying previously registered IDs according to the biological identification information.

In this case, the IC card information reading device and the biological identification information reading device each serve as user identification information identifying means for identifying user IDs.

(Hardware Structure of Control Apparatus)

Figure 5:
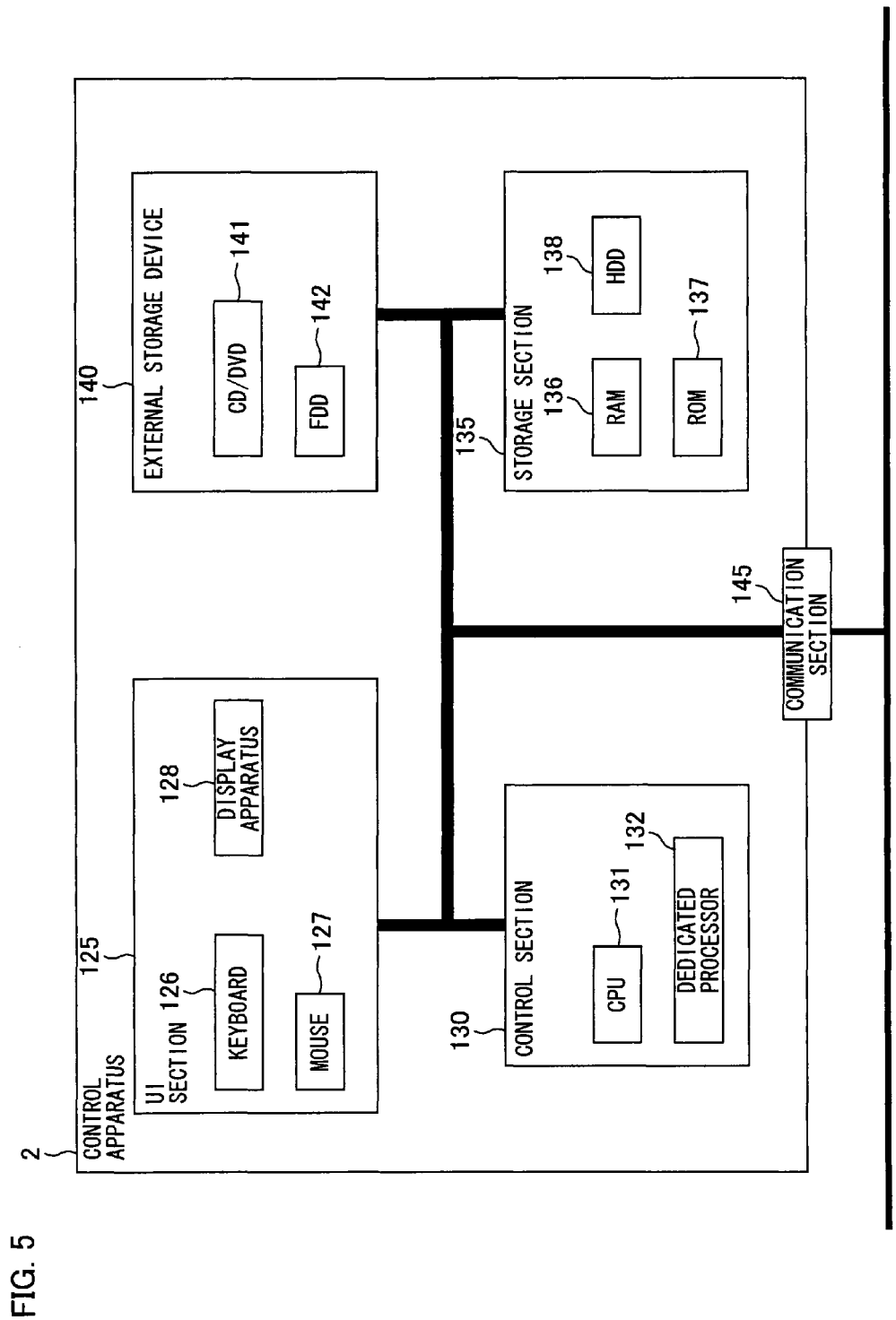
FIG. 5 is a block diagram showing a hardware structure of a control apparatus, according to one embodiment of the present invention.

FIG. 5 is a block diagram showing a hardware structure of the control apparatus 2.

As shown in FIG. 5, the control apparatus 2 is a computer including a UI section 125, a control section 130, a storage section 135, an external storage device 140, and a communication section 145, which are connected to each other by a data bus.

The UI section 125, which includes a keyboard 126, a mouse 127 and a display apparatus 128, serves to accept data input from a user or send various information items to a user. The communication section 145 serves as an interface for carrying out communication with an external device such as the multi-functional apparatus 1.

The control section 130 includes a CPU 131 and a dedicated processor 132. Further, the storage section 135 includes a RAM 136, a ROM 137, and a HDD 138. The external storage device 140 includes a CD/DVD 141 and a FDD 142.

In the control apparatus 2, the CPU 131 of the control section 130 executes various programs stored in the storage section 135 so as to carry out various functions. More specifically, the CPU 131 executes a control program for the UI section 125 so as to accept data input from a user and also send various information items to a user. Further, the CPU 131 executes a control program for the communication section 145 to carry out a communication process, such as transmission/reception of various data items. Further, in the control apparatus 2, the CPU 131 carries out an application program to carry out processing such as OCR or translation.

The control apparatus 2 transmits, to the multi-functional apparatus 1, control commands for controlling various functions of the multi-functional apparatus 1, so as to use one or plural Web services provided by the multi-functional apparatus 1. The Web service designates program processing for allowing an external device to use the function(s) of the local device via a network, which is usually performed by SOAP.

On the other hand, the multi-functional apparatus 1 makes access to the control apparatus 2 serving as a web server, obtain data for an operation display-image from the control apparatus 2, and causes the control panel 6 to display the operation display-image. That is, the multi-functional apparatus 1 and a user can interact with each other. With this arrangement, the multi-functional apparatus 1 can perform display merely by requesting acquisition of operation display-image data to the control apparatus 2; that is, the multi-functional apparatus 1 does not need to store the operation display-image data.

With this arrangement, in the multi-functional apparatus control system according to the present embodiment, the control apparatus 2 and the multi-functional apparatus 1 carry out an operation in association with each other (cooperation process). Further, since the control apparatus 2 is capable of controlling the operation of multi-functional apparatus 1, a flexible system can be realized.

Further, as described later, the multi-functional apparatus 1 uses, regardless of the machine type, a common API (Application Program Interface) for external publication. This arrangement enables the control apparatus 2 to output a common command to the multi-functional apparatus 1 regardless of the machine type of the multi-functional apparatus 1. This facilitates development of a program to be built into the control apparatus 2. Note that, API designates a rule (function) group for specifying the order used in the development of software, and the processes executed by the order.

The multi-functional apparatus 1 and the control apparatus 2 use HTTP, or HTTPS using SSL (Secure Socket Layer) for communication regarding request for operation display-image data and a reply to the request. This usage of HTTPS gives an effect of improvement in security. Further, Examples of the markup language used in the communication includes terms composed of HTML (Hypertext Markup Language), XML (eXtensible Markup Language), WML (Wireless Markup Language), XHTML (eXtensible HyperText Markup Language), and/or other languages.

Note that, XML is descriptive language of a document structure which can be transmitted/received as data with a similar easiness as the HTML, and typically has the following advantages.

(1) The user can mark up a text string in the document.
(2) It does not depend on specific software.
(3) Easy programming.

On the other hand, the communication of control commands in the operation for controlling the multi-functional apparatus 1 by the apparatus 2 is performed by an interobject communication protocol such as a SOAP (Simple Object Access Protocol) using a markup language of XML or the like. The SOAP is a protocol for calling up data or services based on XML and HTTP, and allows one system to be associated with another.

The following explains a functional structure of the multi-functional apparatus 1 and the control apparatus 2.

(Structure of Control Apparatus)

Figure 1:
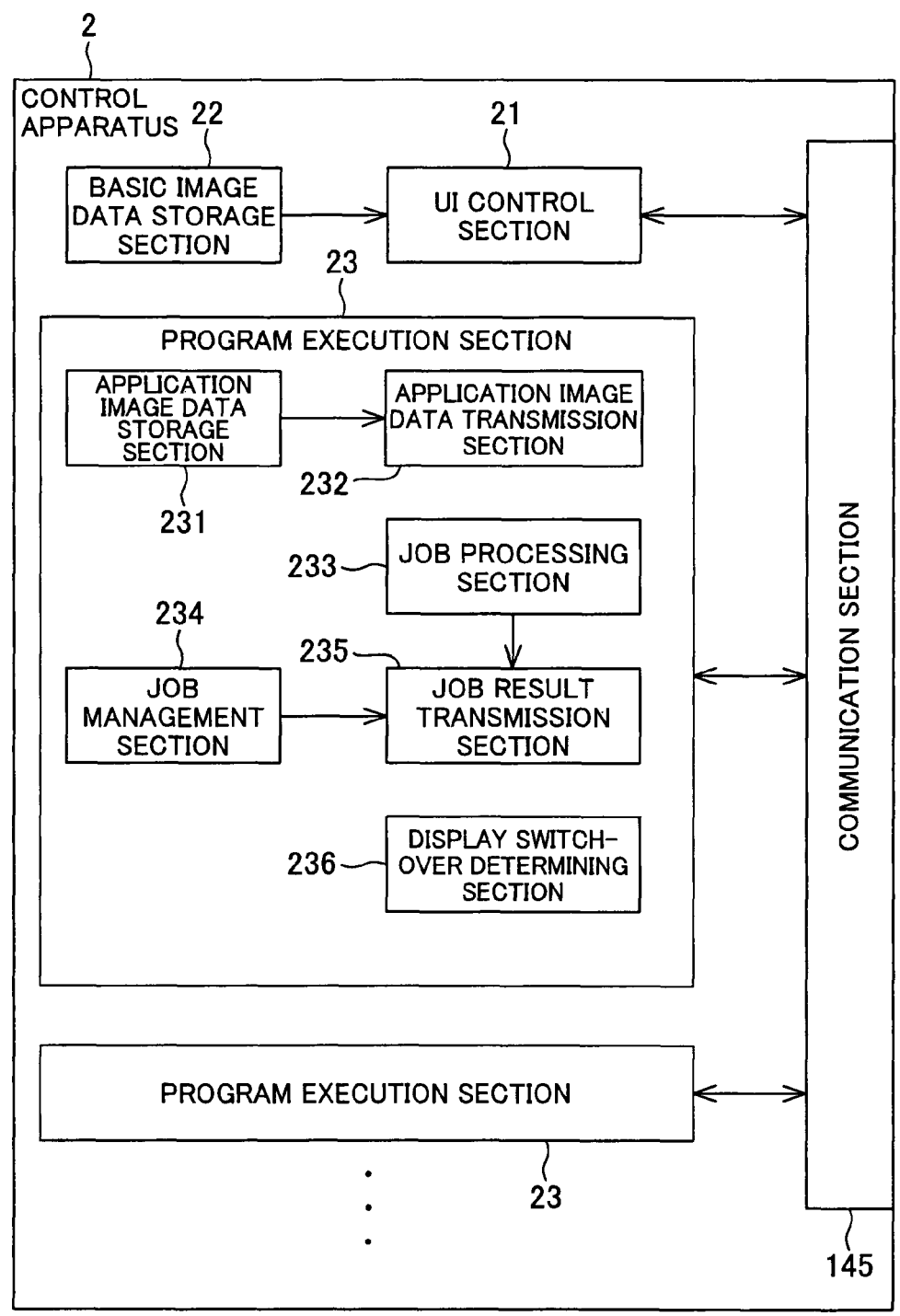
FIG. 1 is a block diagram showing a functional structure of a control apparatus according to First Embodiment of the present invention.
Figure 2:
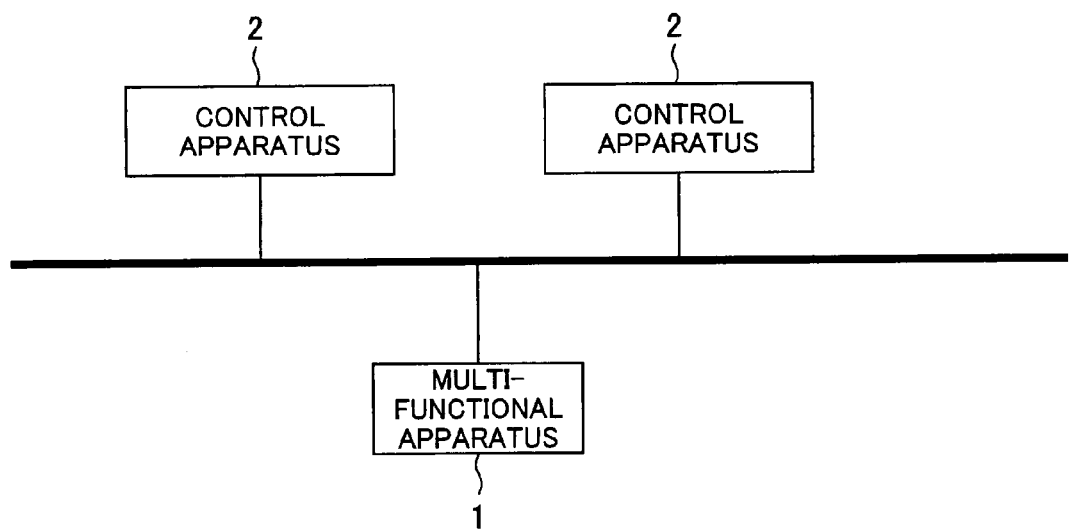
FIG. 2 is a drawing showing a structure of a multi-functional apparatus control system according to the present invention.

FIG. 1 is a block diagram showing a functional structure of the control apparatus 2 according to the present embodiment. As shown in FIG. 1, the control apparatus 2 includes a UI control section 21, a basic display-image data storage section 22, and a plurality of program execution sections 23. These sections are realized by a cooperation of hardware including the control section 130 and the storage section 135 shown in FIG. 5, and software constituted of a program stored in the storage section 135.

The basic display-image data storage section 22 stores image data (basic display-image data, hereinafter) corresponding to each of: a user registration image for inputting a user ID for identifying the user, and an application selection image for selecting an application program used in the cooperation process.

The UI control section 21 performs control of an image displayed in the control panel of the multi-functional apparatus 1, and also controls processing of input information in the display.

More specifically, the UI control section 21 receives a transmission request for basic display-image data from the multi-functional apparatus 1, reads out basic display-image data from the basic display-image data storage section 22 according to the transmission request, and outputs the basic display-image data to the multi-functional apparatus 1 via a communication section. Note that, the UI control section 21 transmits image data to the multi-functional apparatus 1 using HTTP (or HTTPS).

Further, when receiving the transmission request for application display-image data (described later) stored in the program execution sections 23, the UI control section 21 outputs the transmission request to the program execution sections 23.

Further, the UI control section 21 receives, from the multi-functional apparatus 1, input information (eg. setting condition) inputted by the user onto the image of the image data transmitted to the multi-functional apparatus 1, and outputs the input information to the program execution sections 23.

Each of the program execution sections 23 executes a process of a corresponding application program.

One example of program execution sections 23 executes a process of an English-Japanese (From English into Japanese) automatic translation application program. In this case, the program execution sections 23 executes a step of generating a control command for causing a multi-functional apparatus 1 to scan image data, a step for extracting text (OCR process) from the image data scanned in accordance with the control command, a step for carrying out English-Japanese translation with respect to the extracted text, and a step for generating a control command for causing the multi-functional apparatus 1 to print an image including the Japanese text resulted from the translation.

Each program execution section 23 includes a job management section (data processing means) 234, an application display-image data storage section 231, an application display-image data transmission section 232, a job processing section (data processing means) 233, a display switch-over determining section (controlling means) 236, and a job result transmission section (process result outputting means) 235.

Figure 6:
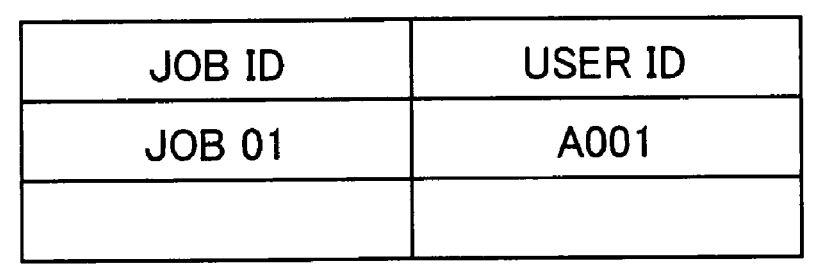

The job management section 234 serves to store/manage separate job IDs for identifying each of the job the control apparatus 2 which has been instructed to execute, and separate user IDs for identifying the user who has inputted the instruction. The job IDs and the user IDs are associated with each other in the job management section 234. The job management section 234 receives user IDs and job IDs from the multi-functional apparatus 1 via the communication section, and associates these IDs in a job management table. FIG. 6 is a drawing showing an example of a job management table.

The application display-image data storage section 231 stores application display-image data corresponding to an instruction-input image for allowing the user to input various setting condition for executing the application program.

The application display-image data transmission section 232 reads out application display-image data from the application display-image data storage section 231 according to the transmission request for application display-image data from the UI control section 21, and transmits application display-image data to the multi-functional apparatus 1 via the communication section.

The job processing section 233 sequentially executes various processes according to the setting condition received from the UI control section 21. The series of jobs executed based on the setting condition transmitted from the UI control section 21 is hereinafter referred to as an application job. As described, the multi-functional apparatus control system according to the present embodiment is capable of accepting an instruction of a cooperation process before the preceding cooperation process is completed. The job processing section 233 executes in parallel a plurality of application jobs of differing cooperation processes.

According to the received setting condition, the job processing section 233 acquires image data to be processed. In the present embodiment, this image data to be processed is the image data scanned by the multi-functional apparatus 1. Therefore, the job processing section 233 transmits a request for scanning and a request for the scanned image data with respect to the multi-functional apparatus 1, and acquires the image data. Further, at this time, the job processing section 233 acquires a job ID with the image data, and outputs the job ID to the job management section 234.

The application job executed by the job processing section 233 with respect to the image data includes a control command generation process and application data processing.

The control command generation process designates a process of generating a command for controlling the multi-functional apparatus 1. Examples of various control commands include a printing command for instructing printing of image data, and a facsimile transmission command for instructing facsimile transmission of image data.

The application data processing designates a process of generating image data or various data items used in executing an image output process such as printing or communication by the multi-functional apparatus 1. In the following example, image data is generated in this application data processing.

The job processing section 233 carries out a process by appropriately combining the control command generation process and the application data processing. The combination is specified in the application program.

For example, in the case of a job processing section 233 which executes a process of an English-Japanese translation printing application program, this job processing section 233 carries out English-Japanese translation with respect to the image data scanned by the multi-functional apparatus 1, and carries out printing of the resulting image (translation) expressed by the image data in the multi-functional apparatus 1 in the following sequential manner.

(1) OCR process for extracting text from image data transmitted from the multi-functional apparatus 1

(2) English-Japanese translation of the text obtained by the OCR process (3) Generation of a printing command for instructing printing of the image data including text resulted from the English-Japanese translation The job processing section 233 associates the job ID with the control command and the image data resulted from the control command generation process and the application data processing, and outputs the resulting data to the job result transmission section 235.

The display switch-over determining section 236 determines, in the application data processing of image data for each job ID, (a) whether the number of pages indicated by image data to be processed is equal to or greater than the predetermined value, (b) whether the size of image data to be processed is equal to or greater than the predetermined value, (c) whether the characteristic amount (except for number of pages and file size) extracted from the image data to be processed is equal to or greater than the predetermined value. The characteristic amount extracted from the image data includes the number of texts, number of words or the like, which is previously set for each application program. Further, the predetermined thresholds are set respectively for (a), (b), and (c).

If one or more of the determination processes (a), (b) and (c) are found to be equal to or greater than the threshold values, the display switch-over determining section 236 transmits, to the multi-functional apparatus 1, a control command indicating a switch-over instruction into a user registration image. Then, the multi-functional apparatus 1 sends a transmission request for user registration display-image data to the control apparatus 2. As a result, the UI control section 21 of the control apparatus 2 reads out basic display-image data corresponding to the user registration image from the basic display-image data storage section, and transmits the data to the multi-functional apparatus 1. In this manner, the operation display-image displayed in the multi-functional apparatus 1 is switched into the user registration image, and the multi-functional apparatus 1 can accepts an instruction of another cooperation process.

Further, in the case where one or more of the determination processes (a), (b) and (c) are found to be equal to or greater than the threshold values, the display switch-over determining section 236 outputs a command "required" associated with the job ID as inquiry requirement information to the job result transmission section 235. On the other hand, in the case where all of the determination processes (a), (b) and (c) are found to be less than the threshold values, the display switch-over determining section 236 outputs a command "not required" associated with the job ID as inquiry requirement information to the job result transmission section 235.

The job result transmission section 235 receives the control command and the image data from the job processing section 233, and transmits the control command and the image data to the multi-functional apparatus 1. However, the job result transmission section 235 transmits the control command and the image data only when the following condition is met.

More specifically, the job result transmission section 235 transmits the control command and the image data associated with the job ID to the multi-functional apparatus 1 with the job ID, in the case where the job result transmission section 235 receives the inquiry requirement information "not required" associated with the job ID from the job processing section 233.

On the other hand, in the case where the job result transmission section 235 receives the inquiry requirement information "required" associated with the job ID from job processing section 233, the job result transmission section 235 sends to the multi-functional apparatus 1 a request for transmission of a login user ID which indicates a logged-in user (user who has logged in and currently accessing to the multi-functional apparatus 1). In this way, the control apparatus 2 obtains the login user ID from the multi-functional apparatus 1. Further, the job result transmission section 235 reads out the user ID corresponding to the job ID received from the job processing section 233 from the job management sections 234. Further, if the login user ID is the same as the user ID read out from the job management sections 234, or if the login user ID indicates "none", the job result transmission section 235 transmits the job ID, the control command and the image data obtained from the job processing section 233 to the multi-functional apparatus 1.

Note that, when the login user ID indicates "none", the job result transmission section 235 adds a command (temporary storage command) for temporarily suspending the job execution before sending the data to the multi-functional apparatus 1.

(Schematic Functional Structure of Multi-functional Apparatus)

Figure 7:
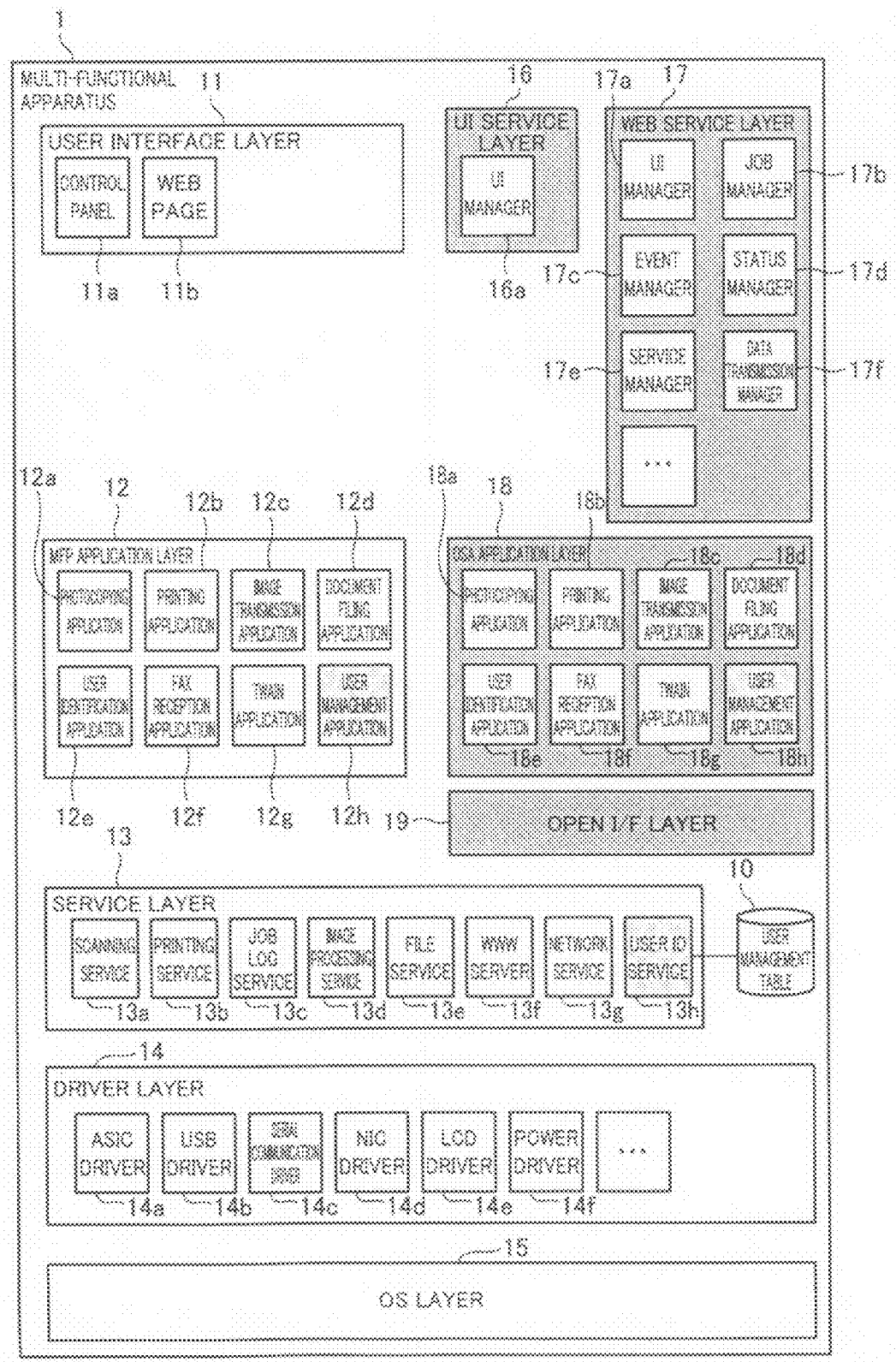
FIG. 7 is a block diagram showing a functional structure of a multi-functional apparatus according to First Embodiment of the present invention.

The following explains a structure of the multi-functional apparatus 1. FIG. 7 is a block diagram showing a functional structure of a multi-functional apparatus according to the present embodiment. As shown in FIG. 7, the multi-functional apparatus 1 includes an user interface layer 11, a MFP application layer 12, a service layer 13, a driver layer 14, an OS layer 15, an UI service layer (process request outputting means) 16, a web service layer 17, an OSA application layer 18, and an open I/F layer 19. These layers and the respective blocks contained in the layers are realized by a cooperation of hardware including the control section 100 and the storage section 105 shown in FIG. 3, and software constituted of a program stored in the storage section 105.

The OS layer 15 manages an operating system.

The driver layer 14 is provided above the OS layer 15, and controls the hardware of the multi-functional apparatus 1. The respective sections of the driver layer 14 operate in accordance with a driver program serving to control various hardware items of the multi-functional apparatus 1.

The driver layer 14 according to the present embodiment includes an ASIC driver 14a for image forming, an USB driver 14b for USB communication, a serial communication driver 14c for serial communication, a NIC driver 14d for LAN communication, a LCD driver 14e for controlling display of control panel 6, and a power driver 14f for power supply management.

The service layer 13 is provided above the driver layer 14, and serves to execute various functions of the multi-functional apparatus 1 in accordance with the application layer 12.

Examples of the service layer 13 according to the present embodiment include a scanning service 13a for carrying out scanning, a printing service 13b for carrying out printing, a job log service 13c for managing information on the job basis, image processing service 13d for carrying out image forming such as image creation, a file service 13e for managing images such as document filing, a WWW server service 13f for making access from a remote via a web page, a network service 13g for carrying out communication using LAN, telephone line or the like, and a user ID service 13h for managing an user ID for identifying the user who inputs a job execution instruction with respect to the multi-functional apparatus 1.

The user ID service carries out a process of modifying an user management table 10 (shown in FIG. 8) in which (i) a job ID of an uncompleted job, (ii) an user ID indicating the user who had instructed execution of the job which have not been completed, and (iii) login information indicating whether the user of said user ID is currently accessing to the multi-functional apparatus 1 are associated with each other. Note that, in FIG. 8, login information "Yes" indicates that the user of said user ID is currently accessing to the multi-functional apparatus 1, and "No" indicates that the user of said user ID is currently not accessing to the multi-functional apparatus 1.

The MFP application layer 12 is provided above the service layer 13, and serves to output instructions to execute various services of the service layer 13 in accordance with an application program.

The MFP application layer 12 of the present embodiment includes a photocopying application 12a for carrying out execution/control of scanning, a printing application 12b for carrying out execution/control of printing, an image transmission application 12c for carrying out execution/control of transmission of the scanned image data to an external device, a document filing application 12d for carrying out execution/control of document filing, an user identification application 12e for carrying out execution/control of user identification, a FAX reception application 12f for carrying out FAX reception, a TWAIN application 12g for carrying out execution/control of TWAIN process, and an user management application 12h for carrying out execution/control of a conversion process of the user management table 10.

When a new user ID is inputted into the inherent operation display-image, the user management application 12h instructs the user ID service 13h to register the user ID, the job ID, and the login information "Yes" to the user management table 10 so that they are associated with each other. Further, when the job is completed, the user management application 12h deletes the job ID indicating the cooperation process, and the user ID and the login information corresponding to the job ID.

The user interface layer 11 is an interface for allowing the user to operate a multi-functional apparatus 1. The user interface layer 11 stores an inherent operation display-image (inherent operation display-image) of a multi-functional apparatus 1, and displays the inherent operation display-image in the control panel 6. The user can execute the applications of the MFP application layer 12 by inputting an instruction of execution of a desired process into the inherent operation display-image.

Note that, the control panel section 11a of the user interface layer 11 carries out a process of transmitting information having been inputted to the operation display-image of the multi-functional apparatus 1 to the MFP application layer 12.

Further, the web page section 11b carries out a process for transmitting information having been inputted to the web page to the MFP application layer 12.

Note that, the user interface layer 11, the MFP application layer 12, the service layer 13, the driver layer 14 and the OS layer 15 operate in accordance with the inherent software of the multi-functional apparatus 1, and vary depending on the type of the multi-functional apparatus 1.

These layers allow the multi-functional apparatus 1 to directly receive an instruction from the user without using a communication network, and operate in accordance with the instruction.

However, in the case where the multi-functional apparatus 1 includes only the inherent layers, the control apparatus 2 is required to control the multi-functional apparatus 1 using an exclusive control command to said multi-functional apparatus 1, which makes the process complicated. The multi-functional apparatus 1 according to the present embodiment further includes the following layers, which enables the multi-functional apparatus 1 to receive common control commands from the external control apparatus 2.

The UI service layer 16 acquires operation display-image data from the control apparatus 2 using the HTTP (or HTTPS), and displays an operation display-image based on the operation display-image data on the control panel 6. Note that, the UI service layer 16 may be realized by a versatile UI service layer having a web browser function.

Provision of the UI service layer 16 and the user interface layer 11 allows the user to switch operation display-image on the control panel 6 between a standard operation mode in which (1) a desired function is executed in the multi-functional apparatus 1 by inputting an instruction into an inherent operation display-image (displayed by the user interface layer 11) of the multi-functional apparatus 1, and (2) an open system mode using a network resource (eg. RCD application). Note that, the multi-functional apparatus 1 includes a mode switch-over section for selecting between the UI service layer 16 and the user interface layer 11 so that the blocks of the selected layer are activated. In accordance with user input or a control command from the control apparatus 2, the mode switch-over section selects between the standard operation mode (a mode operated by the user interface layer 11) and the open system mode (a mode operated by the UI service layer 16).

Note that, the UI service layer 16 includes a UI manager 16a for controlling UI (operation display-image) display provided by the control apparatus 2.

The UI manager 16a transmits a transmission request for display-image data using HTTP (or HTTPS) to the control apparatus 2. Then, the UI manager 16a displays an image based on the display-image data received as a response in the control panel 6. In this manner, the UI manager 16a receives display-image data from the control apparatus 2, and serves as UI process means for displaying an image corresponding to the received display-image data in the control panel 6.

Further, the UI manager 16a transmits information inputted onto the display-image to the control apparatus 2 using HTTP (or HTTPS).

The web service layer 17 serves to receive a control command transmitted from the control apparatus 2 using SOAP, and call an appropriate module of a OSA application layer 18 corresponding to the control command. Further, the web service layer 17 generates a SOAP command indicating information received from the OSA application layer 18, and transmits the command to the control apparatus 2. The web service layer 17 stores association between a control command and an appropriate module of a OSA application layer 18 indicated by the control command, and call an appropriate module according to the association.

The web service layer 17 according to the present embodiment includes, for example, an UI manager 17a for processing a web service regarding UI control such as display change, a job manager 17b for processing a web service regarding job control, an event manager 17c for processing a web service regarding an event transmission request, a status manager 17d for processing a web service regarding status control of job/device, a service manager 17e for registering information regarding an OSA application layer 18, and a data transmission manager 17f for processing a web service for carrying out transmission of job data.

In the present embodiment, the job manager 17b suspends execution of the job in the case where the control command and the image data transmitted from the control apparatus 2 includes a temporary storage command. After receiving a restart instruction by the user who had inputted the execution of the job, the job manager 17b carries out the job.

The OSA application layer 18 serves to control the aforementioned cooperation process, and outputs a first API, which is a control command from the control apparatus 2, to the open I/F layer 19 based on the application program. As described later, the API applicable to (published) the open I/F layer 19 does not depend on the machine type of the multi-functional apparatus 1 Therefore, the OSA application layer 18 is not required to change the program code for each multi-functional apparatus 1.

The OSA application layer 18 according to the present embodiment includes, for example, a photocopying application 18a for carrying out execution/control of photocopying, a printing application 18b for carrying out execution/control of printing, a scanning application 18c for carrying out execution/control of transmission of the scanned image data to an external device, a document filing application 18d for carrying out execution/control of document filing, an user identification application 18e for carrying out execution/control of user identification, FAX reception application 18f for carrying out FAX reception, a TWAIN application 18g for carrying out execution/control of TWAIN process, and an user management application 18h for carrying out execution/control of a conversion process of the user management table 10.

When a new user ID is inputted into the user registration image for carrying out a cooperation process, the user management application 18h instructs the user ID service 13h to register the user ID, the job ID, and the login information "Yes" so that they are associated with each other. Further, when the cooperation process is completed, the user management application 12h deletes the job ID indicating the cooperation process, and the user ID and the login information corresponding to the job ID. Also, when receiving from the control apparatus 2 a switch-over instruction to change the display into the user registration image, the user management application 18h modifies all login information into "No".

The open I/F layer 19 lays open the first API for controlling the service layer 13 in the OSA application layer 18. The open I/F layer 19 also receives the first API from the OSA application layer 18, and changes the received first API into a second API of a format acceptable by the service layer 13.

The open I/F layer 19 includes a conversion table storage section (not shown) storing a conversion table in which the first API received from the OSA application layer 18 and the second API externally opened by the service layer 13 are associated with each other, and calls the second API opened by the service layer 13 according to the conversion table. FIG. 9 is a drawing showing an example of command conversion table in an open I/F layer.

The open I/F layer 19 opens a common first API in the OSA application layer 18 for all multi-functional apparatuses 1. On this account, it is not necessary to change the program code of the OSA application layer 18, and it is possible to define a disclose method by which the web service layer 17 makes it open for all multi-functional apparatuses 1. That is, the respective program execution sections 23 of the control apparatus 2 can carry out control of the web service layer 17 using a common method applicable to all multi-functional apparatuses 1.

Figure 10:
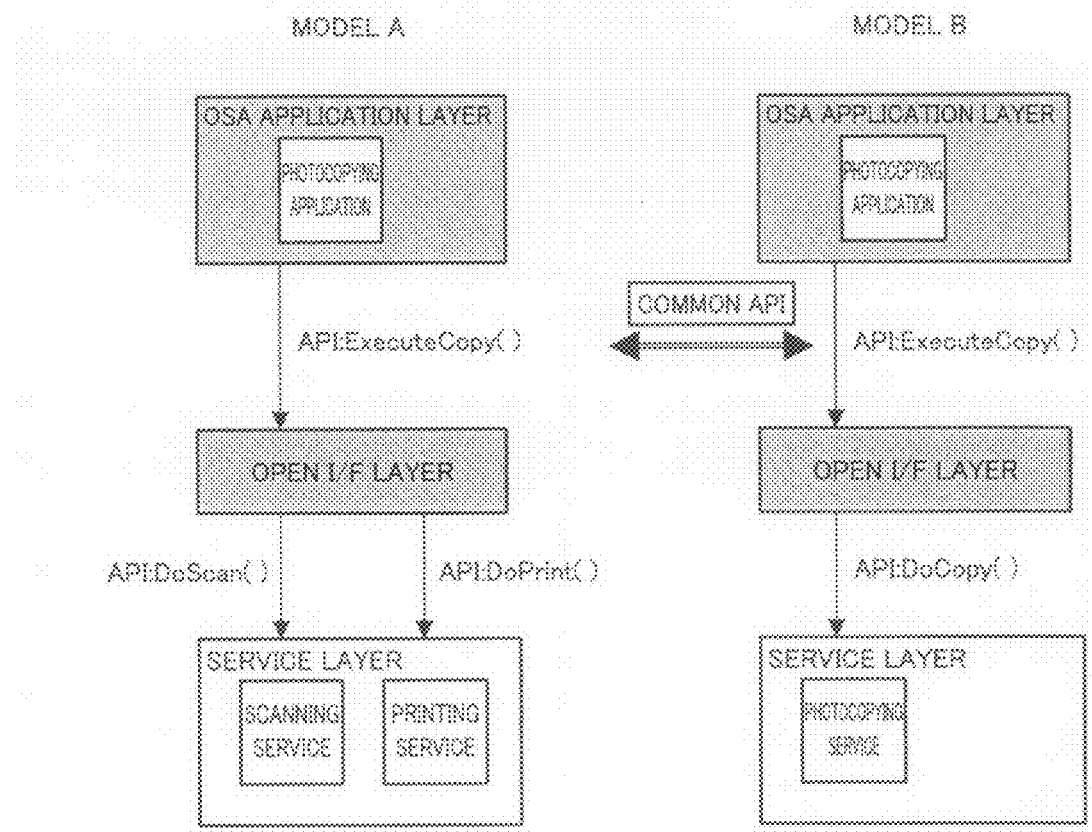
FIG. 10 is a drawing for explaining a function of the open I/F layer.

FIG. 10 is a drawing for explaining a function of the open I/F layer.

In FIG. 10, the multi-functional apparatus 1 of the model A has a scanning service 13a and a printing service 13b as service layers 13. In this case, as shown in FIG. 9, the open I/F layer 19 of the multi-functional apparatus 1 of the model A stores, as the command correspondence table, the first API "Execute Copy", the second API "Do Scan" and "Do Print" so that they are associated with each other. Therefore, when receiving the first API "Execute Copy", the open I/F layer 19 executes the scanning service 13a and the printing service 13b according to the modified second API.

On the other hand, the multi-functional apparatus 1 of the model B has a photocopy service as the service layer 13. In this case, the open I/F layer 19 of the multi-functional apparatus 1 of the model B includes the command correspondence table, the first API "Execute Copy" and the second API "Do Copy" so that they are associated with each other. Therefore, when receiving the first API "Execute Copy", the open I/F layer 19 executes the photocopying service according to the modified second API.

As described, provision of the open I/F layer 19 allows the control apparatus 2 or the OSA application layer 18 to give an instruction of execution of photocopying using a common API called "Execute Copy" regardless of the model of the multi-functional apparatus. More specifically, if various types of multi-functional apparatus 1 have different service layers 13, the control apparatus 2 and the OSA application layer 18 can execute the target service(s) using the same first API. Therefore, it is not necessary to use a different first API for each type of multi-functional apparatus 1. This facilitates development of the program for the control apparatus 2 and the OSA application layer 18.

(Entire Flow of Cooperation Process)

Figure 11:
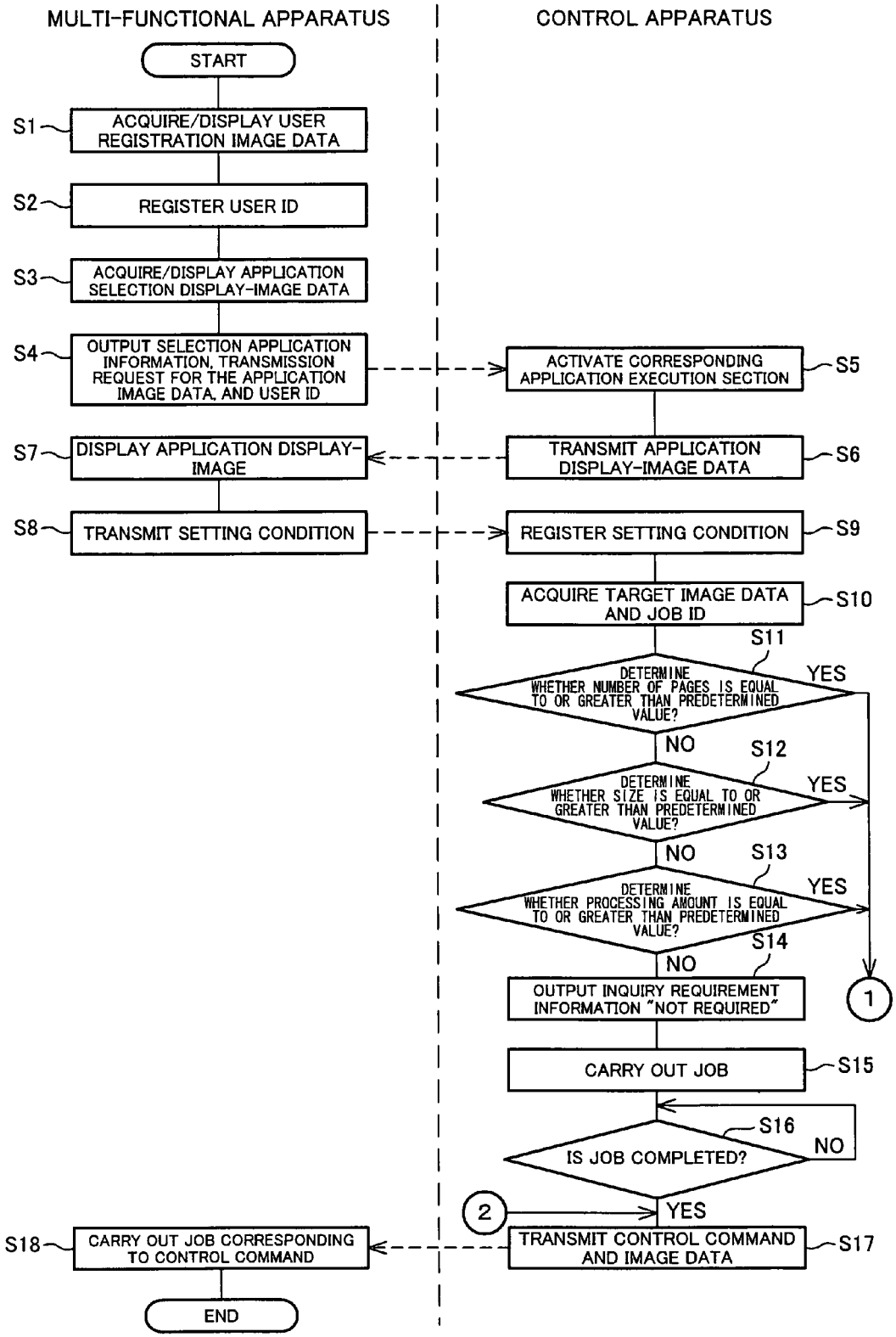
FIG. 11 is a flow chart showing a flow of a cooperation process according to First Embodiment of the present invention.

The following explains the entire flow of a cooperation process which is carried out by a cooperation of the multi-functional apparatus 1 and the control apparatus 2, with reference to a flow chart shown in FIG. 11 and FIG. 12. Note that, the process flow of FIG. 11 and FIG. 12 show a single cooperation process. As described, the multi-functional apparatus control system according to the present embodiment is capable of accepting another cooperation process while carrying out a cooperation process. Therefore, a plurality of the cooperation processes shown in FIG. 11 and FIG. 12 may be carried out in parallel.

First, in the multi-functional apparatus 1, the mode switch-over section (not shown) selects an open system mode for activating the UI service layer 16 according to user input. Then, the UI manager 16a of the UI service layer 16 transmits a transmission request for user registration display-image data to the control apparatus 2. On the other hand, in the control apparatus 2, the UI control section 21 reads out user registration display-image data from the basic display-image data storage section 22 according to the transmission request, and transmits the data to the multi-functional apparatus 1. After that, the UI manager 16a of the multi-functional apparatus 1 displays in the control panel 6 an user registration image expressed by the user registration display-image data transmitted from the control apparatus 2 (S1).

Next, when the user ID is inputted to the user registration image, the user management application 18h of the OSA application layer 18 carries out registration of the user ID inputted on the control panel 6 (touch panel)(S2). More specifically, the user management application 18h instructs the user ID service 13h to update the user management table 10 so that the user ID and the login information "Yes", which indicates that the user expressed by said user ID is currently accessing to the multi-functional apparatus 1, are associated with each other.

Note that, the multi-functional apparatus 1 may acquire the user ID from the IC card information reading device or the biological identification information reading device.

Further, when the user ID is inputted to the user registration image, the UI manager 16a temporarily stores the user ID. Further, the UI manager 16a transmits to the control apparatus 2 a transmission request for display-image data of application selection image for selecting an application program used in the cooperation process, and acquires the display-image data from the control apparatus 2. Then, the UI manager 16a displays the application selection image in the control panel, and receives user input (S3). This input information is to select the application program, and corresponds to the job execution instruction in the cooperation process.

The UI manager 16a outputs to the control apparatus 2 selection application information indicating an application selected in the application selection image, and a transmission request for an application display-image data of the application display-image data for inputting setting condition required for execution of the application. At this time, the UI manager 16a transmits the user ID inputted to the user registration image (S4). This setting is used for execution of an application program, and corresponds to a process request to the control apparatus 2.

In the control apparatus 2, the UI control section 21 activates the program execution section 23 for carrying out an application indicated by the selection application information, and transmits the transmission request for the application display-image data and the user ID to the program execution sections 23 (S5).

Thereafter, the application display-image data transmission section 232 reads out application display-image data from the application display-image data storage section 231 in accordance with the transmission request, and transmits the data to the multi-functional apparatus 1 (S6). Further, the job management sections 234 registers the user ID transmitted from the UI control section 21.

In the multi-functional apparatus 1, the UI manager 16a displays the application display-image in a control panel, and awaits for input of setting condition (S7). Then, the UI manager 16a transmits the inputted setting condition to the control apparatus 2 (S8).

In the control apparatus 2, the UI control section 21 outputs the received setting condition to the program execution sections 23 which transmitted the request for application display-image data and the user ID in the step S5. Thereafter, the job processing section 233 of the program execution sections 23 registers the setting condition (S9), and acquires the target image data and the job ID (S10).

In the present embodiment, the job processing section 233 acquires image data scanned by the multi-functional apparatus 1. Therefore, the job processing section 233 transmits a document transmission command for instructing transmission of the scanned image data to the multi-functional apparatus 1. Next, the web service layer 17 of the multi-functional apparatus 1 calls an image transmission application 18c suitable for the document transmission command. Then, through the open I/F layer 19, the image transmission application 18c instructs the service layer 13 to execute scanning and execute transmission of the scanned image data. At this time, the user ID service 13h of the service layer 13 generates an unique job ID, and updates the user management table 10 by associating the user ID indicating the login information "Yes" with the job ID. At this time, the network service 13g transmits the job ID generated by the user ID service 13h to the control apparatus 2, together with the image data. Then, in the control apparatus 2, the program execution sections 23 which transmitted the document transmission command receives the image data and the user ID (S10).

Thereafter, as shown in FIG. 6, the job management sections 234 stores the user ID sent in the step S4 and the job ID obtained in the step S10 by associating them with each other.

Next, the display switch-over determining section 236 analyzes the obtained image data and determines (a) whether the number of pages is equal to or greater than the predetermined value (S11), (b) whether the size is equal to or greater than the predetermined value (S12), (c) whether the other characteristic amount is equal to or greater than the predetermined value (S13). The other characteristic amount designates the number of recognizable texts in the case of OCR, and the number of words in the case of translation program.

If it is determined as "No" in all of the S11 to S13, the display switch-over determining section 236 associates the job ID with the inquiry requirement information "not required", and outputs the resulting data to the job result transmission section 235 (S14).

Thereafter, the job processing section 233 carries out a process in accordance with an application program with respect to image data obtained from the multi-functional apparatus 1 (S15). After the process is completed (Yes in S16), the job processing section 233 associates the job ID with the generated control command and image data, and transmits the resulting data to the job result transmission section 235. Because the job result transmission section 235 has received the inquiry requirement information "not required" corresponding to the job ID transmitted from the job processing section 233, the job result transmission section 235 associates the job ID with the control command and the image data, and transmits the resulting data to the multi-functional apparatus 1 (S17).

Thereafter, the multi-functional apparatus 1 carries out a job corresponding to the control command from the control apparatus 2 (S18), and finishes the process flow. At this time, the user management application 18h instructs the user ID service to delete, from the user management table 10, the job ID indicating the job and the user ID and the login information corresponding to the job ID.

The following explains a process in the case where it is determined as "Yes" in all of the steps S11 to S13, with reference to the flow chart of FIG. 12.

First, the display switch-over determining section 236 associates the job ID with the inquiry requirement information "required", and outputs the resulting data to the job result transmission section 235 (S21). Further, the display switch-over determining section 236 transmits to the multi-functional apparatus 1 a control command indicating an instruction to change into the user registration image (S22). Then, in the multi-functional apparatus 1, the user management application 18h of the OSA application layer 18 instructs the user ID service 13h to modify all login information stored in the user management table 10 into "No" (S23). Further, the UI manager 16a sends a transmission request for user registration display-image data to the control apparatus 2, and displays the user registration image received from the control apparatus 2 in the control panel (S24). In this way, the multi-functional apparatus 1 can accept an instruction of another cooperation process.

Further, in the control apparatus 2, the job processing section 233 carries out a process in accordance with an application program with respect to the image data obtained from the multi-functional apparatus 1 (S25).

When the process is completed (Yes in S26), the job processing section 233 associates the job ID with the generated control command and the image data, and outputs the resulting data to the job result transmission section 235. Because the job result transmission section 235 has received in S21 the inquiry requirement information "required" corresponding to the job ID transmitted from the job processing section 233, the job result transmission section 235 requests, to the multi-functional apparatus 1, transmission of a user ID of the logged-in user (S27).

In the multi-functional apparatus 1, the status manager 17d reads out a user ID corresponding to the login information "Yes" from the user management table 10, and transmits the user ID to the control apparatus 2 (S28). However, in the case where all items of login information are "No", the status manager 17d transmits the user ID "none". Thereafter, the job result transmission section 235 of the control apparatus 2 obtains an user ID of the logged-in user (S29).

The job result transmission section 235 determines whether the user ID sent back from the multi-functional apparatus 1 indicates "none" (S30), and if it indicates "none" (Yes in S30), the job result transmission section 235 transmits the job ID, the control command, and the image data including a temporary storage command (S33).

Thereafter, in the multi-functional apparatus 1, the job manager 17b of the web service layer 17 temporarily stores the control command and the image data. Further, the UI manager 17a of the web service layer 17 reads out an user ID corresponding to the job ID from the user management table 10, and instructs the UI service layer 16 to display in the control panel 6 a notification saying that the job indicated by the user ID is temporary stored (S34).

Figure 14:
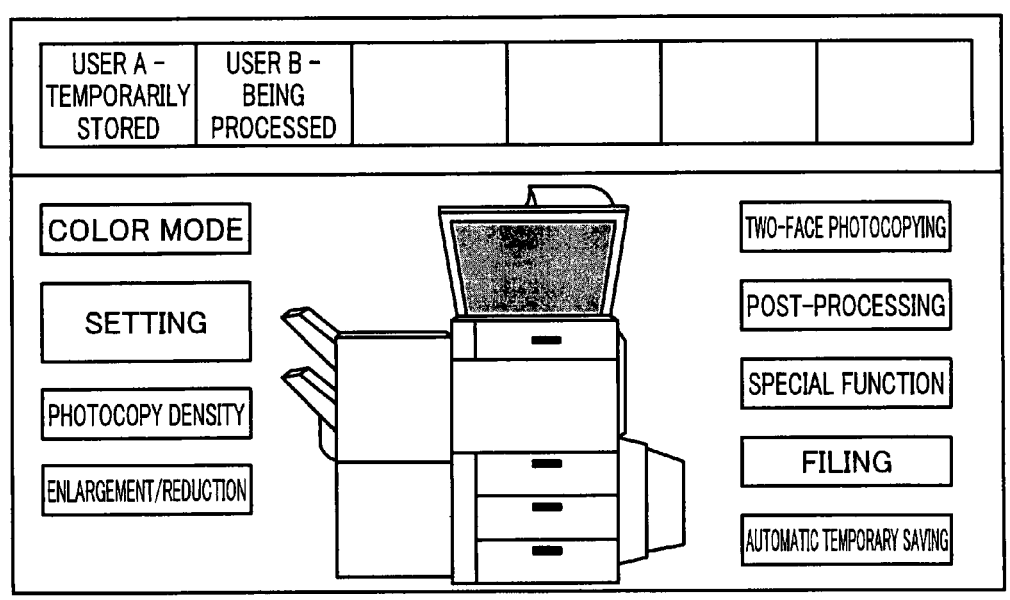
FIG. 14 is a drawing showing an image example shown in a control panel.

FIG. 14 is a drawing showing an image example shown in the control panel in the step S34. This figure shows that a job of a user A is temporary stored. This display serves to inform the user A that the job of the user A is temporary stored so that the user logs into the multi-functional apparatus 1 to restart the job.

Note that, the UI service layer 16 may display in the control panel 6 a notification saying that the job ID, among the job IDs registered in the user management table 10, whose control command and image data has not been transmitted from the control apparatus 2 is currently processed. FIG. 14 shows a state where a job of a user B is currently processed.

On the other hand, when receiving an user ID other than the user ID "none" from the multi-functional apparatus 1 (Yes in S31), the job result transmission section 235 reads out, from the job management sections 234, the user ID corresponding to the job ID received from the job processing section 233 (S31). The job result transmission section 235 then determines whether the user ID obtained in the step S29 is identical with the user ID thus read out from the job management sections 234 (S32). When they are identical (Yes in S32), the job result transmission section 235 associates the job ID with the control command and the image data and transmits the resulting data to the multi-functional apparatus 1 (S17). Note that, if the step S32 is concluded as "No", the sequence goes back to S30.

PROCESS EXAMPLE 1

The following explains a concrete example in which a plurality of different cooperation processes is carried out in parallel. In this example, a plurality of users (user A and user B) use the same application program in the control apparatus 2.

Figure 15:
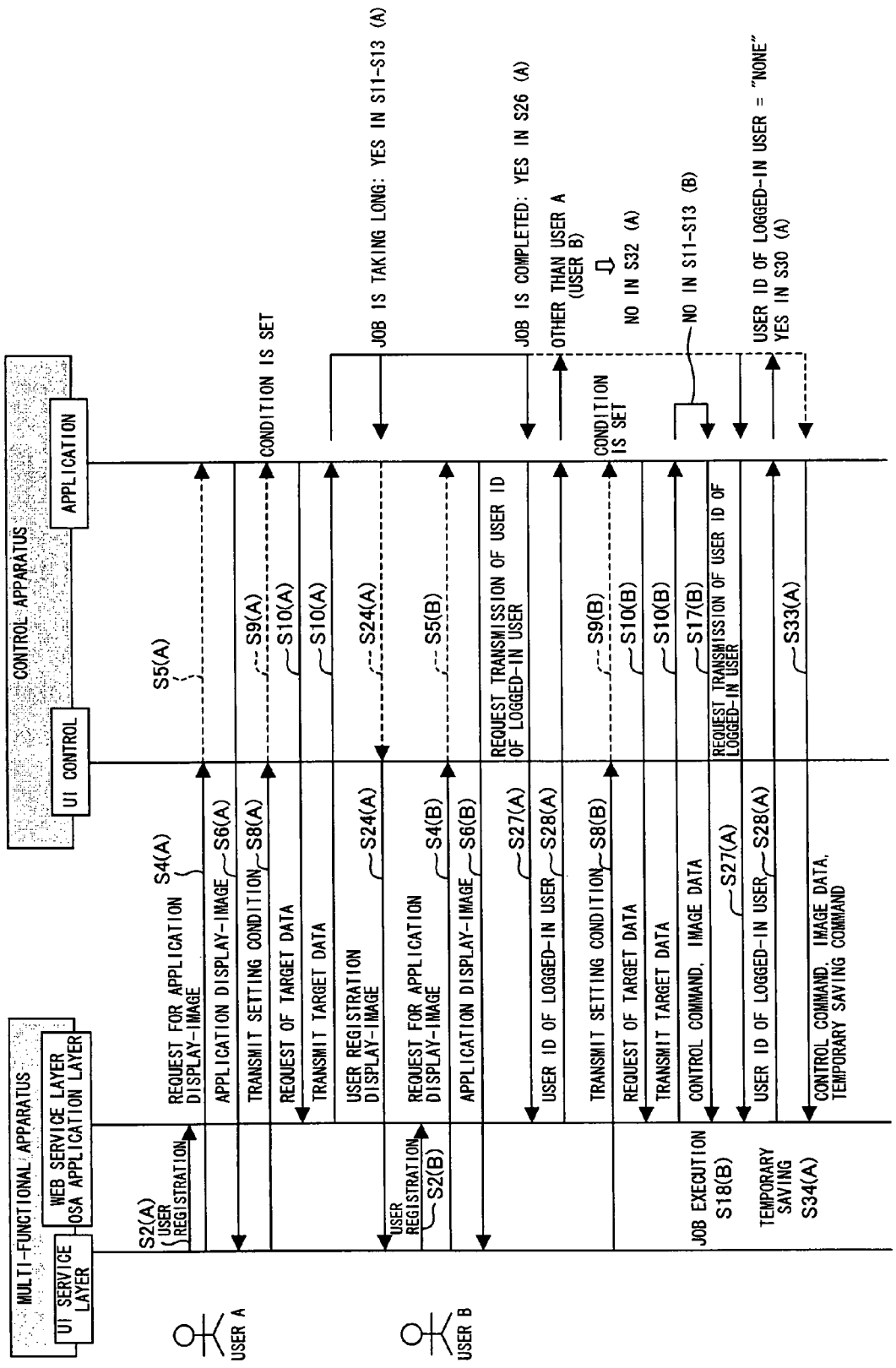
FIG. 15 is a timing diagram showing a data flow among the respective blocks of a multi-functional apparatus and a control apparatus according to Example 1 of First Embodiment.

FIG. 15 shows a timing diagram regarding Process Example 1, showing a data flow between the respective blocks of the multi-functional apparatus 1 and the control apparatus 2. Note that, in FIG. 15, the step identical to any step shown in FIG. 11 and FIG. 12 is given the same reference symbol. Further, in FIG. 15, the symbol "A" in the bracket after the step number indicates a step corresponding to a cooperation process instructed by the user A, and B indicates a step corresponding to a cooperation process instructed by the user B.

Further, in FIG. 15, it is assumed that the image data to be processed in the operation instructed by the user A satisfies at least one of the conditions S11 to S13 ("Yes" in at least one of the conditions S11 to S13) and the image data to be processed in the operation instructed by the user B satisfies none of the conditions S11 to S13 ("No" in all of the conditions S11 to S13).

In this case, as shown in FIG. 15, the display of the control panel of the multi-functional apparatus 1 is switched into the user registration image before the cooperation process instructed by the user A is completed (S24 (A)). Therefore, the user B was able to instruct the multi-functional apparatus 1 to carry out the cooperation process (S2 (B)).

Then, at the time where the process of the application job included in the cooperation process instructed by the user A is completed ("Yes" in S26(A)), the user B is accessing to the multi-functional apparatus 1 (S28(A)), and the process result, i.e. transmission of the control command and the image data, is suspended. Thereafter, at the time where the cooperation process instructed by the user B is completed (S9(B), S10(B), S17(B), S18(B)), and the job ID, the user ID and the login information regarding the cooperation process instructed by the user B is deleted from the user management table 10, the control apparatus 2 transmits the control command and the image data corresponding to the user A (S27(A), S28(A), S30(A), S33(A)).

However, since nobody is accessing to the multi-functional apparatus 1, the control apparatus 2 instructs to temporary store the control command and the image data. Therefore, by inputting a restart instruction of the cooperation process into the multi-functional apparatus 1, the user A may carry out desired image output. Further, when the user desires to print the image on a paper, the other user cannot see the printed image.

PROCESS EXAMPLE 2

The following explains another process example.

In this example, the two different users (user A and user B) use two application programs of the control apparatus 2.

Figure 16:
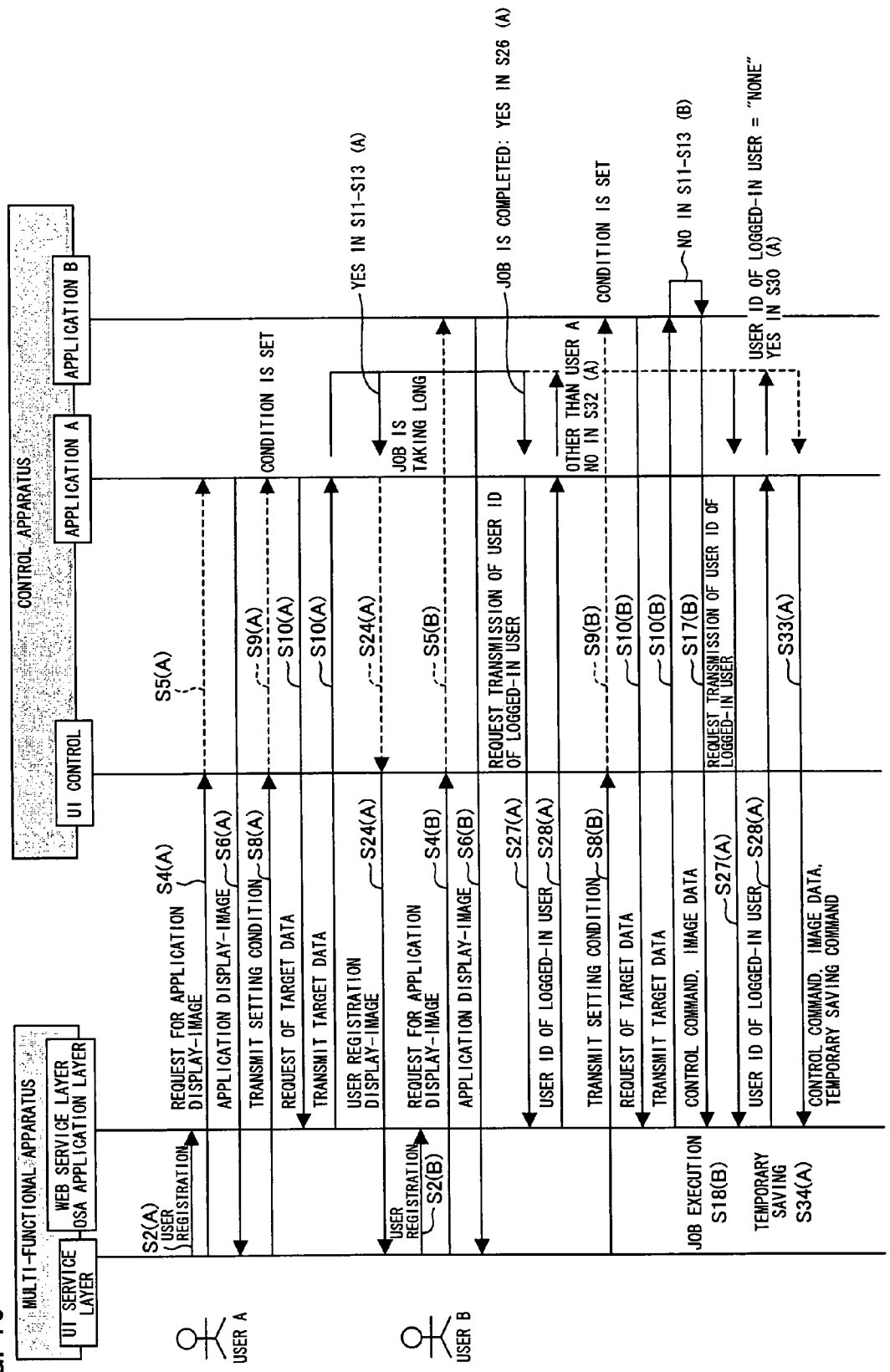
FIG. 16 is a timing diagram showing a data flow among the respective blocks of a multi-functional apparatus and a control apparatus according to Example 2 of First Embodiment.

FIG. 16 is a timing diagram according to Process Example 2, showing a data flow among the respective blocks of the multi-functional apparatus 1 and the control apparatus 2. Further, in FIG. 16, the symbol "A" in the bracket after the step number indicates a step corresponding to a cooperation process instructed by the user A, and B indicates a step corresponding to a cooperation process instructed by the user B.

Further, in FIG. 16, it is assumed that the image data to be processed in the operation instructed by the user A satisfies at least one of the conditions S11 to S13 ("Yes" in at least one of the conditions S11 to S13) and the image data to be processed in the operation instructed by the user B satisfies none of the conditions S11 to S13 ("No" in all of the conditions S11 to S13).

Also in this case where the users use different application programs, as shown in FIG. 16, the display of the control panel of the multi-functional apparatus 1 is switched into the user registration image before the cooperation process instructed by the user A is completed (S24(A)). Therefore, the user B can instruct the multi-functional apparatus 1 to carry out the cooperation process (S2 (B)).

Then, at the time where the process of the application job included in the cooperation process instructed by the user A is completed ("Yes" in S26(A)), the user B is accessing to the multi-functional apparatus 1 (S28(A)), and the process result, i.e. transmission of the control command and the image data, is suspended. Thereafter, at the time where the cooperation process instructed by the user B is completed (S9(B), S10(B), S17(B), S18(B)), and the job ID, the user ID and the login information regarding the cooperation process instructed by the user B is deleted from the user management table 10, the control apparatus 2 transmits the control command and the image data corresponding to the user A (S27(A), S28(A), S30(A), S33(A)).

However, since nobody is accessing to the multi-functional apparatus 1, the control apparatus 2 instructs to temporary store the control command and the image data. Therefore, by inputting a restart instruction of the cooperation process into the multi-functional apparatus 1, the user A may carry out desired image output. Further, when the user desires to print the image on a paper, the other user cannot see the printed image.

Second Embodiment

Another embodiment of the present invention is described below with reference to FIGS. 17 to 21. For ease of explanation, materials having the equivalent functions as those shown in the drawings pertaining to the foregoing First Embodiment will be given the same reference symbols, and explanation thereof will be omitted here.

In First Embodiment, in the case where the inquiry requirement information is "required" the job result transmission section 235 requests the user ID of the logged-in user to the multi-functional apparatus 1. In the present embodiment, the control apparatus 2 stores/manages the login information indicating the presence of logged-in user. Therefore, in the case where the inquiry requirement information is "required", the job result transmission section 235 acquires information of the user ID of the logged-in user within the control apparatus 2.

Note that, in the present embodiment, when the login information of "Yes" is all deleted from the user management table 10, the user ID service 13h of the multi-functional apparatus 1 generates logout information which indicates that there is no logged-in user, and output the information to the control apparatus 2.

(Structure of Control Apparatus)

Figure 17:
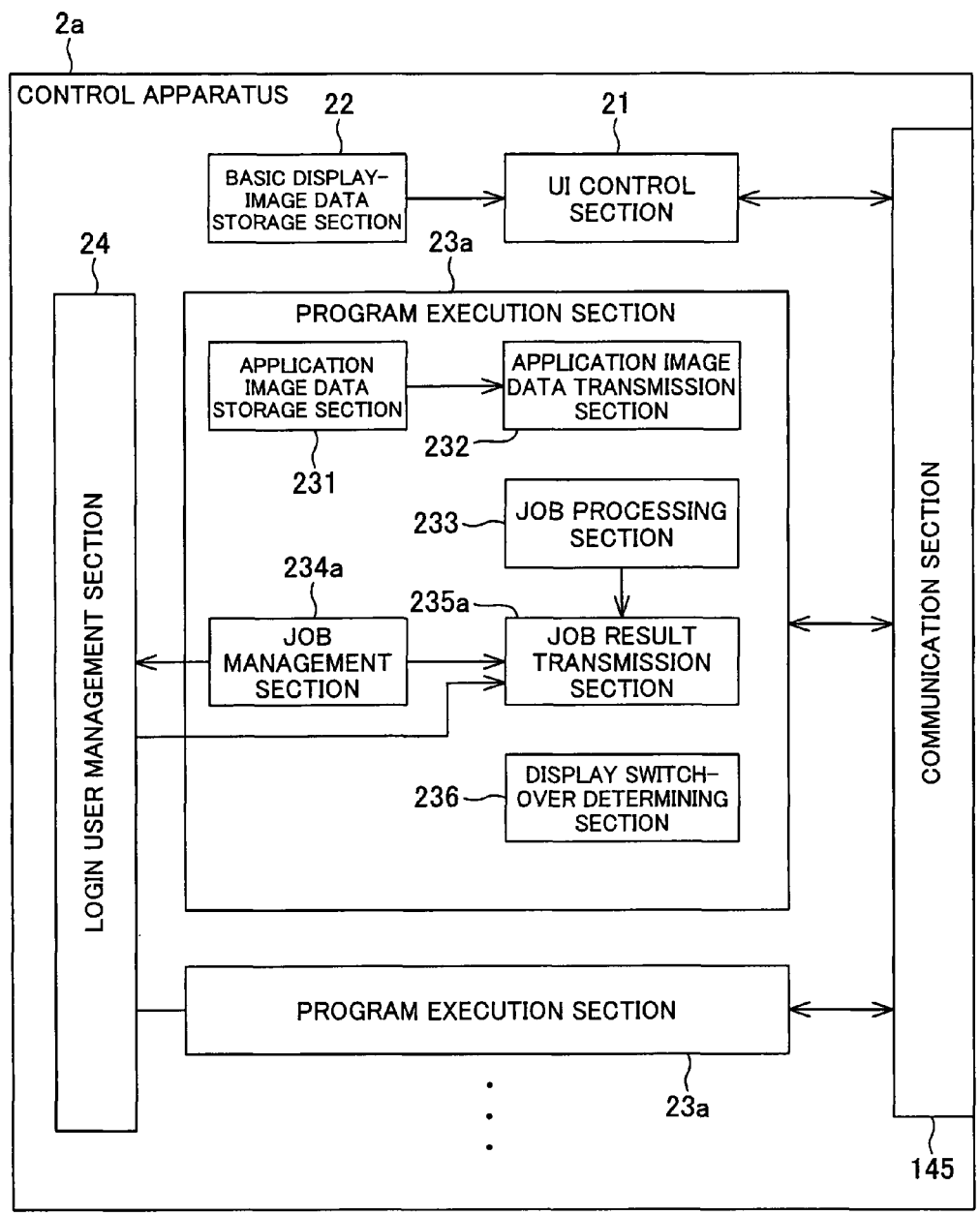
FIG. 17 is a block diagram showing a functional structure of a control apparatus according to Second Embodiment of the present invention.

FIG. 17 is a block diagram showing a functional structure of a control apparatus 2a according to the present embodiment. As shown in FIG. 17, unlike the control apparatus 2, the control apparatus 2a includes a job management section (data processing means) 234a instead of the job management sections 234; a job result transmission section (process result outputting means) 235a instead of the job result transmission section 235; and a login user management section (user identification information storage section) 24.

The login user management section 24 stores/manages the user ID of the logged-in user.

In addition to the function of the job management sections 234, the job management sections 234a has the following function. When receiving the user ID from the UI control section 21 together with the transmission request for application display-image data, the job management sections 234a regards that said user ID indicates the logged-in user, and updates the user ID stored in the login user management section 24.

Further, when the display switch-over determining section 236 transmits to the multi-functional apparatus 1 a control command indicating switch-over into the user registration image, and when the job result transmission section 235a transmits the control command and the image data, the job management sections 234a modifies the user ID stored in the login user management section 24 into "none".

In the case where the inquiry requirement information is "required", the job result transmission section 235a acquires the user ID of the logged-in user not from the multi-functional apparatus 1 but from the login user management section 24, unlike the job result transmission section 235. Otherwise, the job result transmission section 235a is identical to the job result transmission section 235.

(Entire Flow of Cooperation Process)

Figure 18:
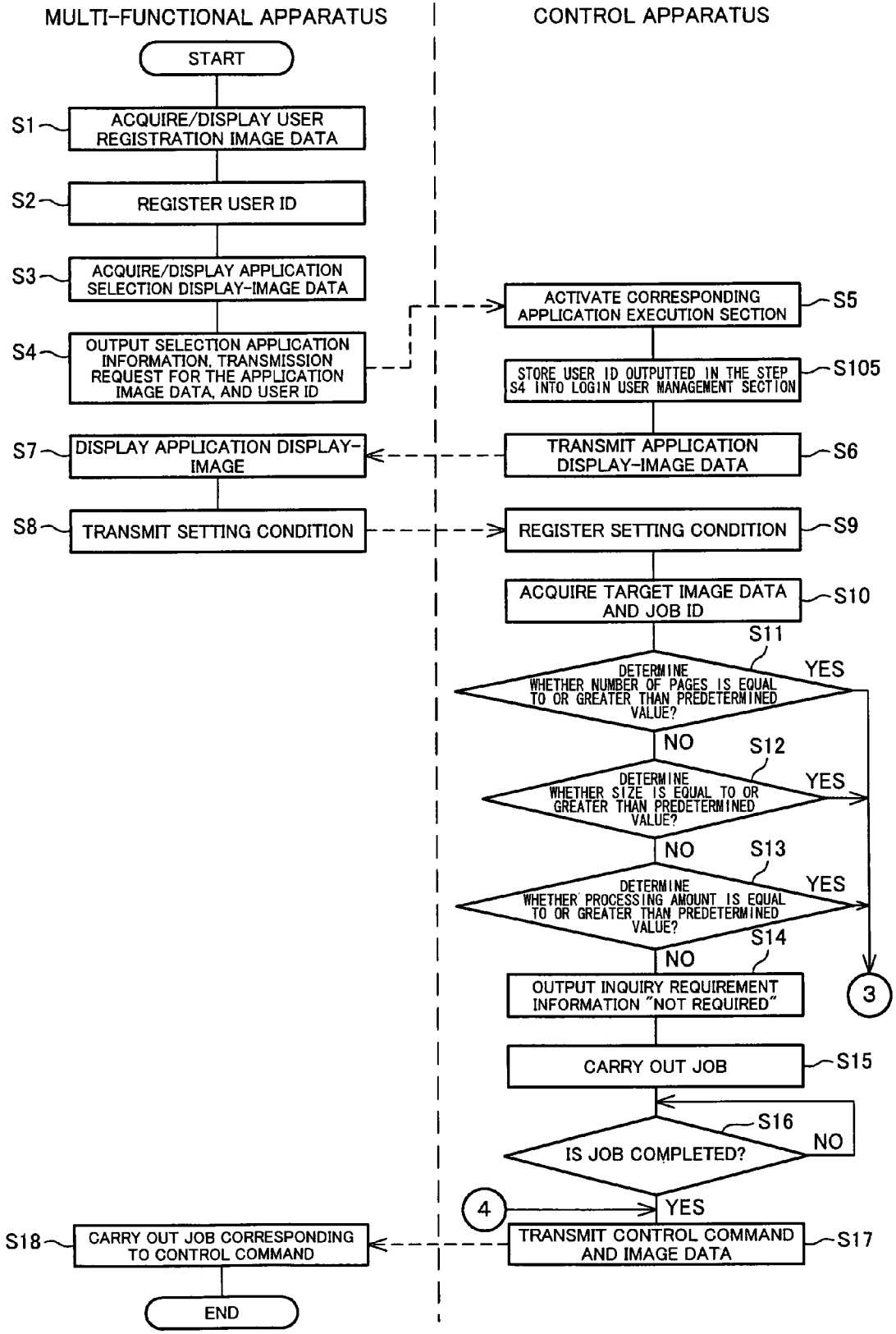
FIG. 18 is a flow chart showing a flow of a cooperation process according to Second Embodiment of the present invention.
Figure 19:
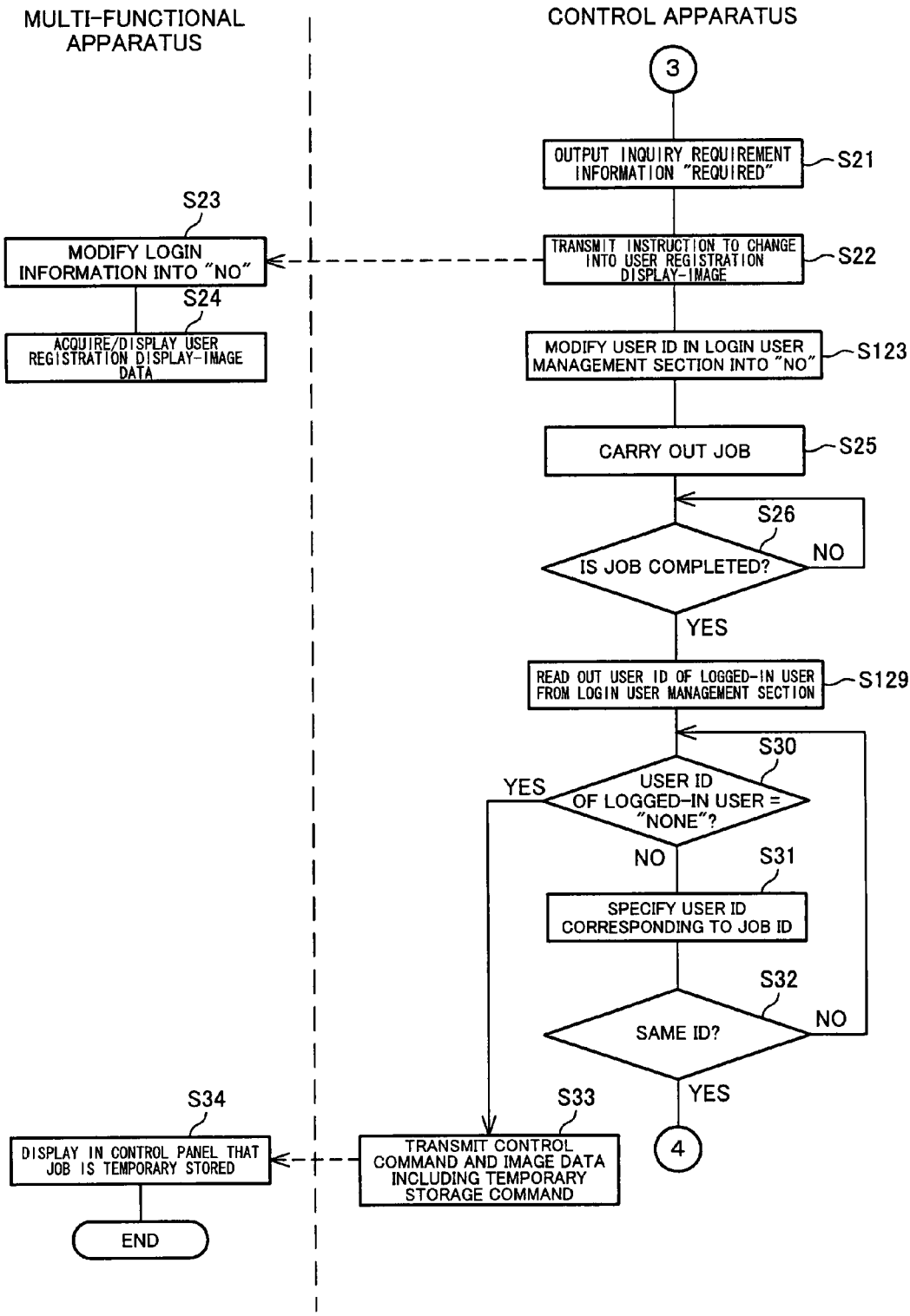
FIG. 19 is a flow chart showing an operation flow in the case of "Yes" in the steps S11 to 13 of FIG. 18.

With reference to the flow chart shown in FIG. 18 and FIG. 19, the following explains the entire flow of a process carried out by a cooperation of the multi-functional apparatus 1 and the control apparatus 2a according to the present embodiment. For ease of explanation, steps (see FIG. 11 and FIG. 12) having the equivalent functions as those shown in First Embodiment will be given the same reference symbols, and explanation thereof will be omitted here.

In the present embodiment, as shown in FIG. 18, after S5, the job management sections 234a regards that said user ID outputted in the step S4 indicates the logged-in user, and updates the login user management section 24 (S105).

Further, in the present embodiment, as shown in FIG. 19, after S22, the job management sections 234a modifies the user ID stored in the login user management section 24 into "none" (S123).

Further, if it is concluded as "Yes" in S26, the job result transmission section 235a reads out the user ID of the logged-in user from the login user management section 24 (S129).

Note that, FIGS. 18 and 19 shows a flow of a single cooperation process. Therefore, during the steps S123 to S129 of the cooperation process, another cooperation may begin, and the used ID in the login user management section 24 may be updated. That is, the user ID read out in the step S129 is not always "No".

As described, the job result transmission section 235a is not required to acquire information of the user ID of the logged-in user from the multi-functional apparatus 1, as it can acquire that from the login user management section 24 within the control apparatus 2. This gives an effect of reducing the time taken to obtain the user ID of the logged-in user.

PROCESS EXAMPLE 3

The following explains another example of the present embodiment, in which plural different cooperation processes are carried out at the same time. This example more specifically explains the case where a user (user A) sequentially uses the same application program of the control apparatus 2a two times.

Figure 20:
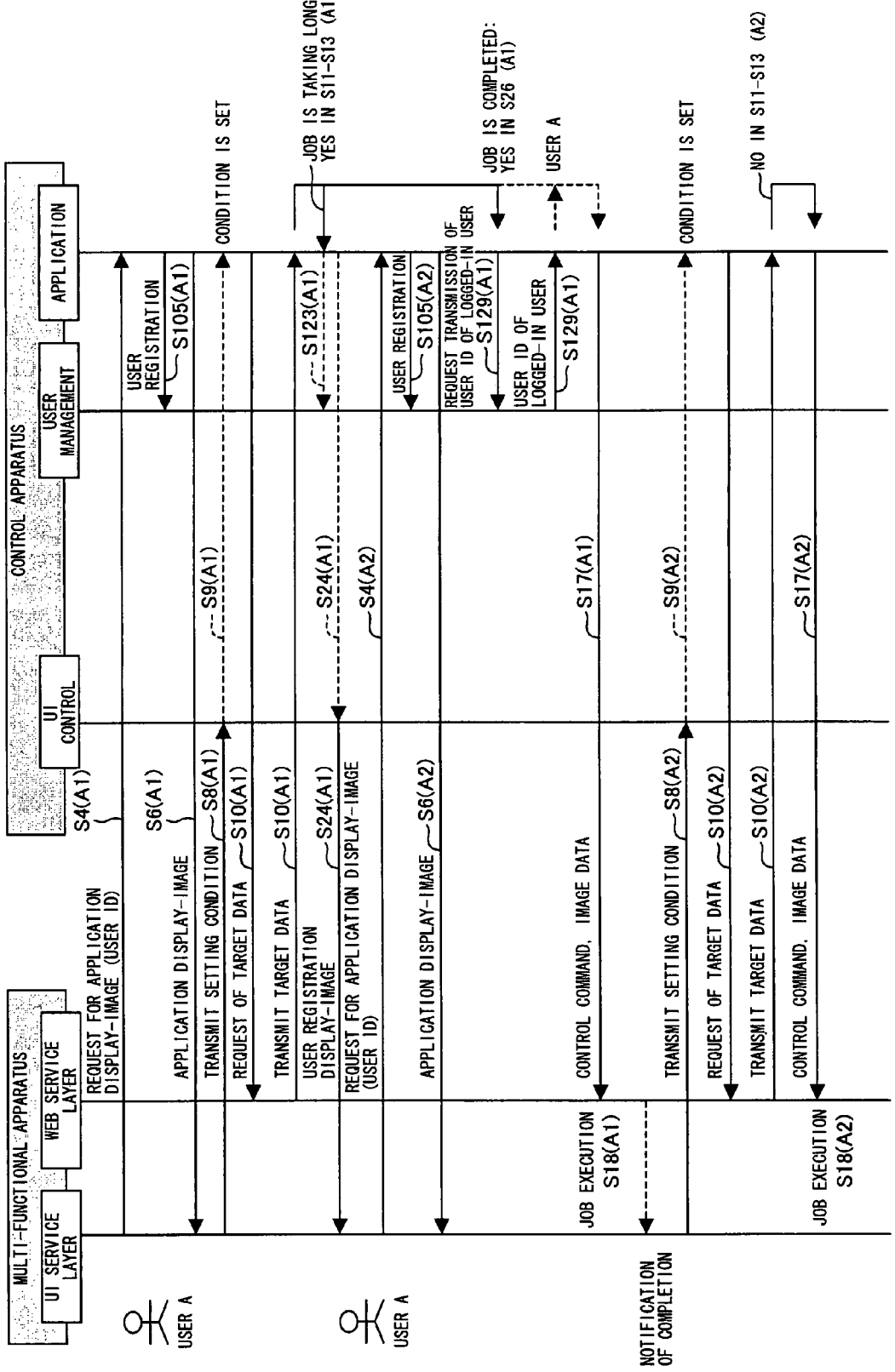
FIG. 20 is a timing diagram showing a data flow among the respective blocks of a multi-functional apparatus and a control apparatus according to Example 3 of Second Embodiment.

FIG. 20 is a timing diagram showing a data flow among the respective blocks of the multi-functional apparatus 1 and the control apparatus 2a. Note that, in FIG. 20, the step identical to any step shown in FIG. 18 and FIG. 19 is given the same reference symbol. Further, in FIG. 20, the symbol "A" in the bracket after the step number indicates a step corresponding to a first cooperation process instructed by the user A, and A2 indicates a step corresponding to a second cooperation process instructed by the user A.

Further, in FIG. 20, it is assumed that the image data to be processed in the first operation satisfies at least one of the conditions S11 to S13 ("Yes" in at least one of the conditions S11 to S13) and the image data to be processed in the second operation satisfies none of the conditions S11 to S13 ("No" in all of the conditions S11 to S13).

In this case, as shown in FIG. 20, the display of the control panel of the multi-functional apparatus 1 is switched into the user registration image at the time of determining that the first operation satisfies at least one of the conditions S1 to S13 ("Yes" in at least one of the conditions S11 to S13) (S24(A1)). Therefore, the user A can instruct the multi-functional apparatus 1 to carry out another cooperation process (S4 (A2)) S6(A2), S8(A2)).

At the time where the process of the application job included in the first cooperation process is completed ("Yes in" S26(A1)), the user A is accessing to the multi-functional apparatus 1 (S129 (A)), and the control apparatus 2s transmits the process result, i.e. transmission of the control command and the image data, to the multi-functional apparatus 1 (S17 (A1)). As a result, the user A can obtain the result of the first cooperation process (S18 (A1)).

Since it does not take long to process the application job included in the second cooperation process ("No" in all of S11 to S13), and when the application job is completed, the control command and image data are transferred from the control apparatus 2a (S17(A2)), and the user A immediately obtain the result of the cooperation process (S18(A2)).

Note that, in this case where a user sequentially logs into the multi-functional apparatus 1 two times to sequentially input two execution instructions, the control panel 6 may display the completion of the first cooperation process corresponding to the first job execution instruction when the process is done.

PROCESS EXAMPLE 4

The following explains another example (Example 4). In this Process Example 4, two different users (user A, user B) use the same application program of the control apparatus 2a.

Figure 21:
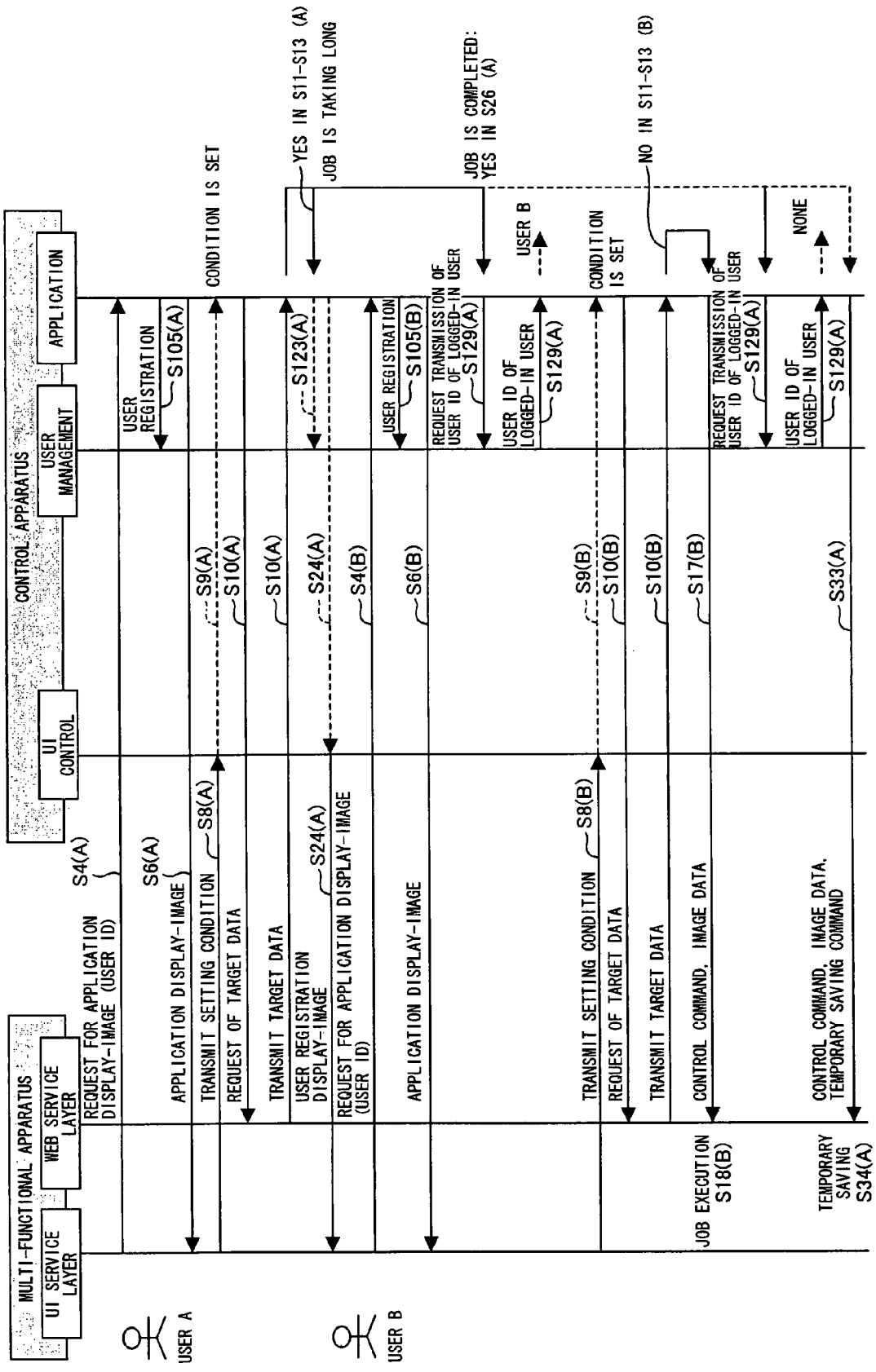
FIG. 21 is a timing diagram showing a data flow among the respective blocks of a multi-functional apparatus and a control apparatus according to Example 4 of Second Embodiment.

FIG. 21 shows a timing diagram regarding Process Example 4, showing a data flow between the respective blocks of the multi-functional apparatus 1 and the control apparatus 2a. Note that, in FIG. 21, the step identical to any step shown in FIG. 18 and FIG. 19 is given the same reference symbol. Further, in FIG. 21, the symbol "A" in the bracket after the step number indicates a step corresponding to a cooperation process instructed by the user A, and B indicates a step corresponding to a cooperation process instructed by the user B.

Further, in FIG. 21, it is assumed that the image data to be processed in the operation instructed by the user A satisfies at least one of the conditions S11 to S13 ("Yes" in at least one of the conditions S11 to S13) and the image data to be processed in the operation instructed by the user B satisfies none of the conditions S11 to S13 ("No" in all of the conditions S11 to S13).

In the case where plural users sequentially carry out the cooperation process, at the time where the application job included in the first cooperation process instructed by the user A is completed ("Yes in" S26(A)), the user B is accessing to the multi-functional apparatus 1 (S129 (A)), and the process result, i.e. transmission of the control command and the image data, is suspended. Thereafter, at the time where the application job instructed by the user B is completed (S17 (B), S18 (B)), and the user ID of the login user management section 24 is modified to "none", the control apparatus 2a transmits the control command and the image data corresponding to the user A (S33 (A)). However, since nobody is accessing to the multi-functional apparatus 1, the control apparatus 2a instructs to temporary store the control command and the image data. Therefore, by inputting a restart instruction of the cooperation process into the multi-functional apparatus 1, the user A may carry out desired image output. Further, when the user desires to print the image on a paper, the other user cannot see the printed image.

Modification Embodiment

MODIFICATION EXAMPLE 1

In the control apparatuses 2/2a according to the First/Second Embodiment, the job result transmission section 235/235a examines the user ID of the logged-in user, and determines whether the control command and the image data should be transmitted. Further, when determining to transmit the control command and the image data, the job result transmission section 235/235a determines whether a temporary storage command needs to be added.

However, this may be arranged as follows. There is no such determination in the control apparatus 2/2a, and the multi-functional apparatus 1 determines whether the execution of control command received from the control apparatus 2/2a should be suspended.

Figure 22:
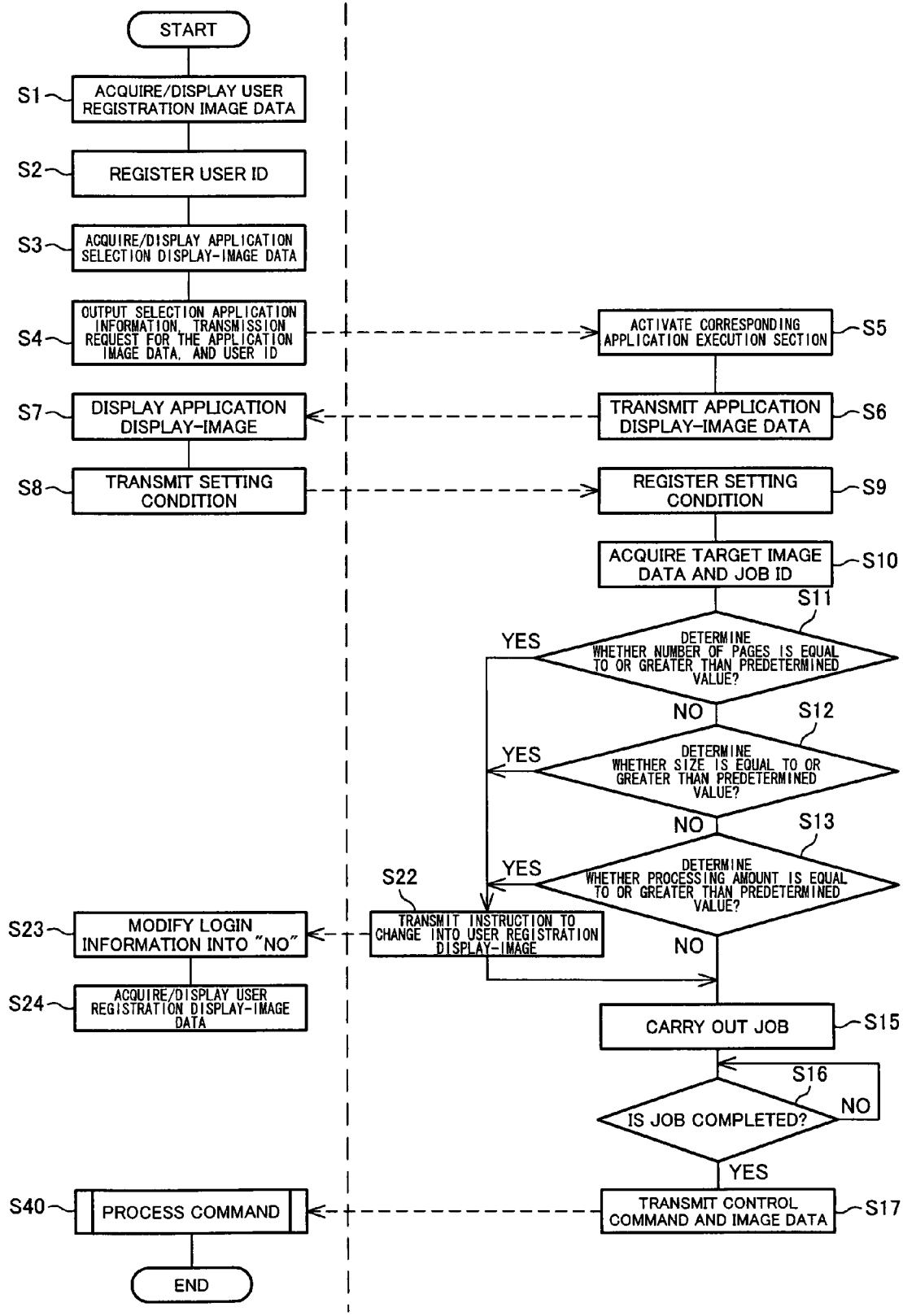
FIG. 22 is a flow chart showing a flow of a cooperation process according to Modification Example 2.

In this case, the multi-functional apparatus 1 and the control apparatus 2/2a operate in accordance with the sequence of the cooperation process shown in FIG. 22. Note that, in FIG. 22, steps having the equivalent functions as those of FIG. 11 will be given the same reference symbols.

As shown in FIG. 22, when receiving the job ID, the control command and the image data, the job result transmission sections 235/235a immediately transmits the job ID, the control command and the image data regardless of the results of the step S11 to S13 (S16, S17).

On the other hand, in response to the reception of the job ID, the control command and the image data, a job corresponding to the control command is carried out in the multi-functional apparatus 1 (S40).

Figure 13:
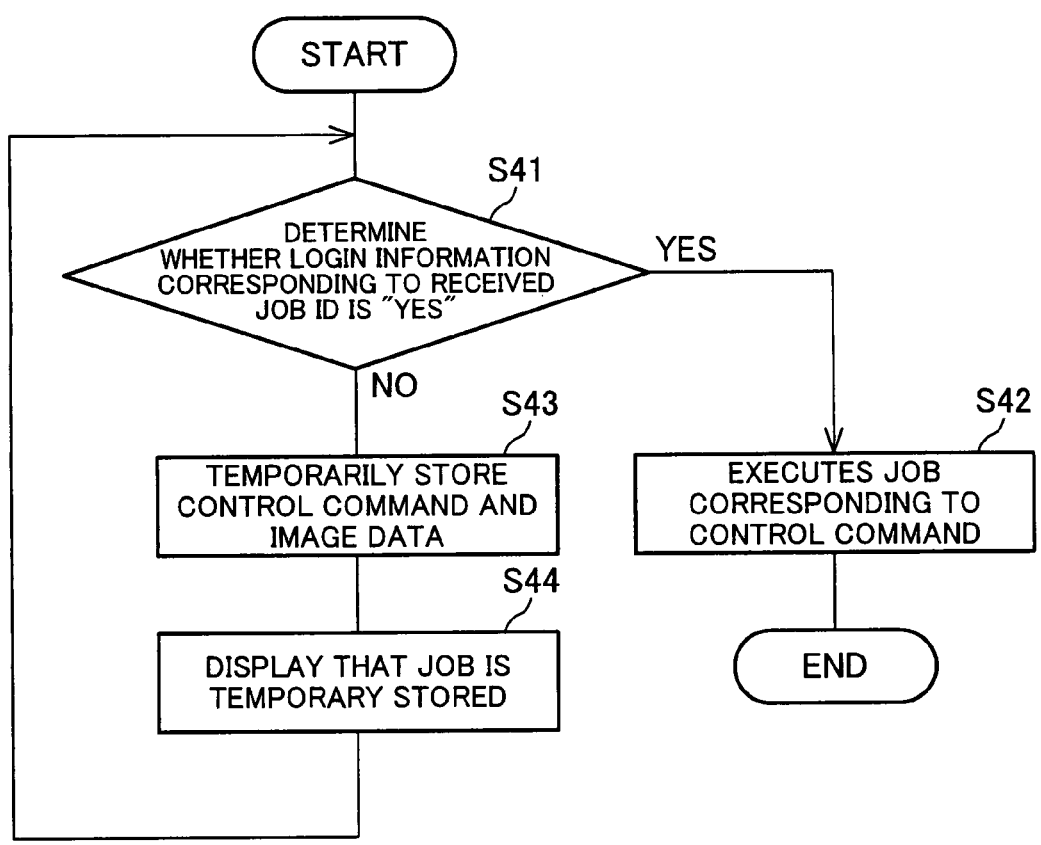
FIG. 13 is a drawing showing a flow of a process executed by a control command from a control apparatus in a multi-functional apparatus according to Modification Example 1.

The following more specifically explains the flow of the step S40, with reference to the flow chart of FIG. 13.

First of all, the job manager of the web service layer 17 determines whether the login information corresponding to the received job ID is "Yes", with reference to the user management table 10 (S41).

When the login information is "Yes" ("Yes" in S41), the web service layer 17 calls a module of the OSA application layer 18 suitable for the control command received from the control apparatus 2/2a, and executes a job corresponding to the control command (S42). At this time, the user ID service deletes the job ID, which has been received with the control command, from the user management table 10.

On the other hand, when the login information is "No" ("No" in S41), the job manager temporarily stores the job ID and the received control command and the image data (S43). Further, the UI manager 17a of the web service layer 17 reads out the user ID corresponding to the received job ID from the user management table 10, and instructs the UI service layer 16 to carry out display which shows that the job of said user ID is temporarily stored (S44). Thereafter, the steps S43 and S44 are repeated until the login information corresponding to the job ID becomes "Yes".

MODIFICATION EXAMPLE 2

In the foregoing case, the display switch-over determining section 236 transmits a control command showing a switch-over instruction into the user registration image to the multi-functional apparatus 1 in the case where at least one of the results of S11 to S13 is "Yes" (one of the factors (a), (b) and (c) is equal to or greater than the threshold value). However, the display switch-over determining section 236 may transmit an instruction of switching into an inherent operation display-image to the multi-functional apparatus 1 in the case where at least one of the steps S11 to S13 is "Yes". Receiving the switch-over instruction into the inherent operation display-image, a mode switch-over section (not shown) of the multi-functional apparatus 1 brings the user interface layer 11 into operation, and causes the control panel to display the inherent operation display-image. On this account, the user who uses the multi-functional apparatus 1 thereafter can use a standard operation mode while seeing the inherent operation display-image.

Note that, if he/she wants to use the open system mode, the user inputs a mode-switch-over instruction, by which the UI service layer 16 is activated and the user registration image is displayed.

Figure 23:
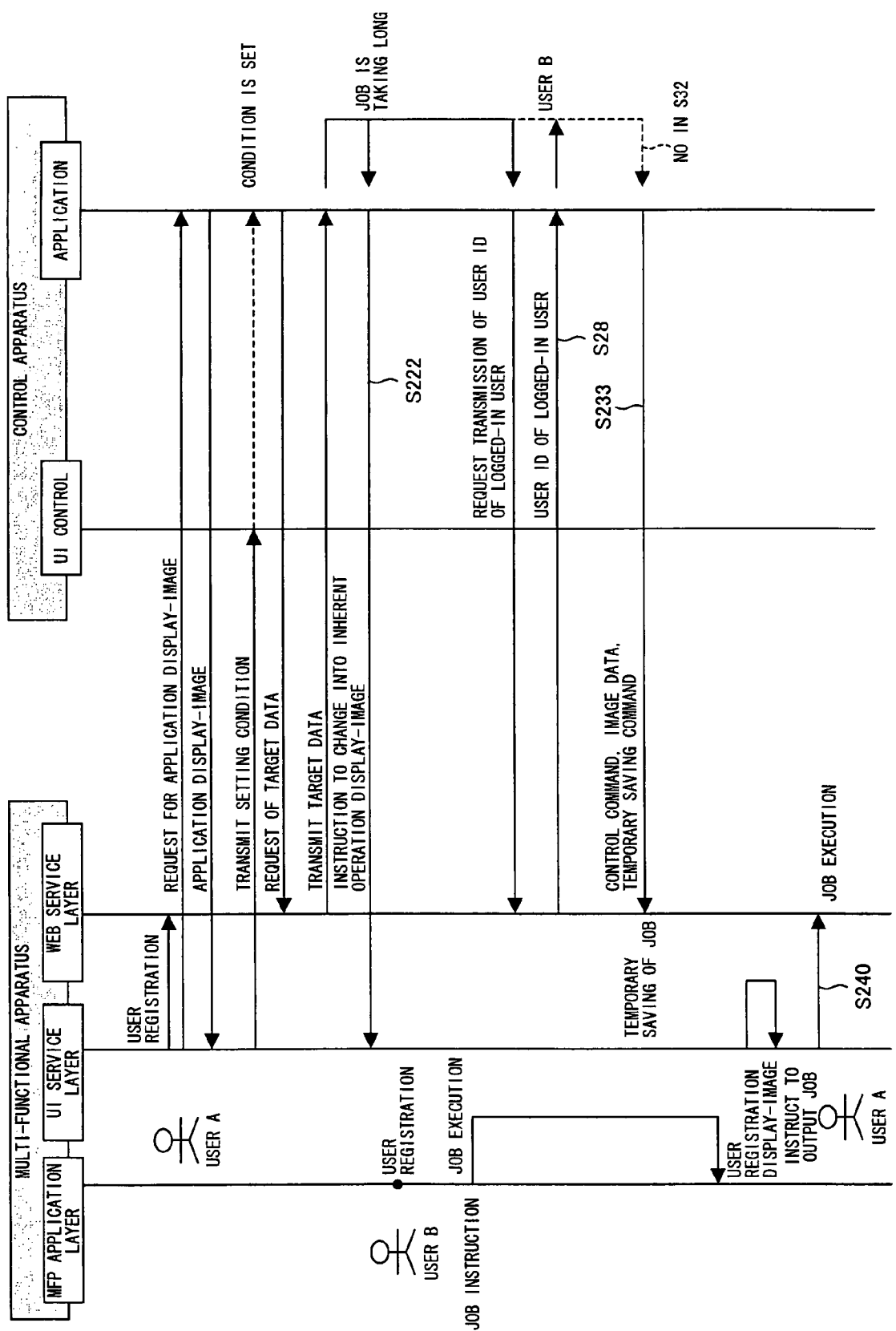
FIG. 23 is a timing diagram showing a data flow among the respective blocks of a multi-functional apparatus and a control apparatus according to Modification Example 2.

FIG. 23 is a timing diagram showing data exchange between the multi-functional apparatus 1 and the control apparatus 2/2a, in the present modification example.

As shown in FIG. 23, if it takes a while to process the application job instructed by the user A ("Yes" in at least one of S11 to S13), the display switch-over determining section 236 outputs to the multi-functional apparatus 1 a switch-over instruction into the inherent operation display-image (S222).

Thereafter, the user B inputs the user ID in the inherent operation display-image. At this time, the user management application 12h of the MFP application layer 12 instructs the user ID service 13h to register the input user ID to the user management table 10.

Thereafter, when the application job of the user A is completed, the job result transmission section 235 requests, to the multi-functional apparatus 1, transmission of the user ID of the logged-in user. As described, since the user management table 10 has been updated, the web service layer 17 can send back the user ID "user B" of the logged-in user also in using the standard operation mode (S28).

MODIFICATION EXAMPLE 3

In the foregoing First and Second Embodiments, the job result transmission section 235 or 235a does not carry out transmission of the job ID, the control command and the image data transmitted from the job processing section 233, if the logged-in user ID does not match with the user ID read out from the job management sections 234 ("No" in S32).

However, as shown in FIG. 23, the job result transmission section 235 or 235a may transmit the job ID, the control command and the image data even when the logged-in user ID does not match with the user ID read out from the job management sections 234 (S233). In this case, a temporary storage command is added to the data. In other words, if it is concluded as "No" in S32, the sequence may move to S33. After the other user logged out, the user A inputs his/her user ID into the user registration image outputted by the UI service layer 16, and instructs output of a job corresponding to the temporarily stored control command, so as to obtain a desired image (S240).

MODIFICATION EXAMPLE 4

In the foregoing case, the job result transmission section 235 or 235a requests transmission of the logged-in user ID to the multi-functional apparatus 1 or the login user management section 24. However, the way of obtaining information of the user ID is not limited to this. For example, the job result transmission section 235 may acquire information as to whether the user of the user ID corresponding to the job ID transmitted from the job processing section 233 is a logged-in user. In this case, the user ID service or the login user management section 24 sends back "1" in the case where the user of the user ID is a logged-in user, and sends back "2" in the case where the user of the user ID is not a logged-in user.

As described, the control apparatus 2/2a is configured to communicate with a multi-functional apparatus 1 and control the multi-functional apparatus 1. The control apparatus 2/2a comprises a job processing section (data processing means) 233 for acquiring, on input of selection application information (a job execution instruction) into the multi-functional apparatus 1, setting condition (process request) corresponding to the selection application information from the multi-functional apparatus 1, and carrying out predetermined data processing corresponding to the setting condition (process request); a job result transmission section (process result outputting means) 235 for outputting to the multi-functional apparatus 1 a process result (control command and image data) given by the job processing section 233; and a display switch-over determining section (controlling means) 236 for controlling the multi-functional apparatus 1 to enable the multi-functional apparatus 1 to accept selection application information from another user during the data processing by the job processing section 233.

Further, the multi-functional apparatus 1 comprises: a UI service layer (process request outputting means) 16d for outputting, on input of the selection application information, process condition (a process request) corresponding to the selection application information to the control apparatus 2/2a; and an image-forming section (image outputting means) 115 for acquiring a process result of the data processing corresponding to the setting condition from the control apparatus 2/2a and carrying out image output corresponding to the process result.

With this arrangement, the multi-functional apparatus 1 can accept an input instruction on an inherent operation display-image or input of selection application information (job execution instruction) from another user during the data processing by control apparatus 2/2a. More specifically, the foregoing arrangement allows a user to input a job execution instruction to the multi-functional apparatus 1 to start the job even when another user uses an application program of the control apparatus 2/2a. Consequently, even when the job of the application program instructed by the previous user takes a while, the next user does not have to be wait until the data processing is completed. This improves user convenience.

Further, in First Embodiment, the user management table 10 of the multi-functional apparatus 1 stores (i) a user ID (first user identification information) for identifying a logged-in user. Meanwhile, in the control apparatus 2, the job management sections 234 (data processing means) acquires, together with the setting condition, (ii) another user ID (second user identification information) for identifying a user who inputted the setting condition, and, when the job processing section 233 completed the data processing, the job result transmission section 235 determines whether (i) the user ID acquired by the job management sections 234 together with the process request corresponding to the data processing coincides with (ii) the user ID stored in the multi-functional apparatus 1, and in a case where they coincide with each other, outputs the process result (control command and image data) of the data processing to the multi-functional apparatus 1 and causes the multi-functional apparatus 1 to carry out a job corresponding to the process result.

On the other hand, in a case where they do not coincide with each other, the job result transmission section 235 suspends output of the process result of the data processing to the multi-functional apparatus 1.

Further, in Second Embodiment, the login user management section 24 of the control apparatus 2a stores (i) a user ID (first user identification information) for identifying a logged-in user who has logged into the multi-functional apparatus 1. Meanwhile, the job management sections 234a (data processing means) acquires, together with the setting condition, (ii) another user ID (second user identification information) for identifying a user who inputted the setting condition, and, when the job processing section 233 completed the data processing, the job result transmission section 235a determines whether (i) the user ID acquired by the job management sections 234a together with the process request corresponding to the data processing coincides with (ii) the user ID stored in the login user management section 24, and in a case where they coincide with each other, outputs the process result (control command and image data) of the data processing to the multi-functional apparatus 1 and causes the multi-functional apparatus 1 to carry out a job corresponding to the process result.

On the other hand, in a case where they do not coincide with each other, the job result transmission section 235a suspends output of the process result of the data processing to the multi-functional apparatus 1.

With this arrangement, the process result of data processing is not transmitted while other logged-in user is accessing to the multi-functional apparatus 1. Therefore, the output image as a result of job execution corresponding to the process result will not be seen by other user. Therefore the user cannot mistakenly take away printed paper or the like resulted from an instruction by other user.

Also, after input of job execution instruction, the user can leave the multi-functional apparatus 1 while the control apparatus 2 is processing data. Then, the user can longs in the multi-functional apparatus 1 again to acquire a process result corresponding to the job execution instruction from the control apparatus 2, causing the multi-functional apparatus 1 to carry out a job corresponding to the process result. Therefore, it requires less time to keep the user waiting in front of the multi-functional apparatus 1.

Note that, as with Modification Example 3, when the job processing section 233 completed the data processing, the job result transmission section 235/235a determines whether (i) the user ID acquired by the job management sections 234/234a together with the process request corresponding to the data processing coincides with (ii) the user ID indicating the logged-in user, and in a case where they do not coincide with each other, outputs the process result of the data processing to the multi-functional apparatus 1, and causes the multi-functional apparatus 1 to carry out a job corresponding to the process result after at least a user indicated by the first user identification information logged out.

With this arrangement, the job based on the process result of data processing is not carried out while other logged-in user is accessing to the multi-functional apparatus 1. Therefore, the output image as a result of job execution corresponding to the process result will not be seen by other user. Therefore the user cannot mistakenly take away printed paper or the like resulted from an instruction by other user.

Finally, the respective blocks of the multi-functional apparatus 1 and the control apparatus 2/2a may be constituted of a hardware logic. However, in the present invention, the respective blocks are realized by software with a CPU 101/131.

More specifically, the multi-functional apparatus 1 and the control apparatus 2/2a includes a CPU (central processing unit) 101/131 for carrying out a program for realizing the respective blocks, a ROM (read only memory) 107/137 or a HDD (hard disk drive) 108/138 for storing the program, a RAM (random access memory) 106/136 for developing the program, a storage device (storage medium; such as a memory) 105/135/140 for storing the program and various data items. Further, when the respective blocks of the multi-functional apparatus 1 and the control apparatus 2/2a are realized as software, the program code (execute form program, intermediate code program, source program) of the multi-functional apparatus 1 and the control apparatus 2/2a is stored in a program medium readable by a computer, which medium is provided to the multi-functional apparatus 1 and the control apparatus 2/2a. In this way, the objective of the present invention may also be achieved by reading out (enforcing) the program code stored in the storage medium by the computer (or, by CPU, MPU).

The program media is a storage medium removable from the device body. Examples of the program medium include one fixedly holds the program code, which can be (a) a tape system such as a magnetic tape, a cassette tape or the like, (b) a disk system which includes a magnetic disk such as a floppy disk*trademark*, a hard disk or the like and an optical disk such as a CD-ROM, an MO, an MD, a DVD or the like, (c) a card system such as an IC card (inclusive of a memory card), an optical card or the like, and (d) a semiconductor memory such as a mask ROM, an EPROM, an EEPROM, a flash ROM.

Further, the multi-functional apparatus 1 and the control apparatus 2/2a may be constituted to be connectable to a communication network, so as to allow provision of the program code via a communication network. The communication network is not particularly limited, and it may be: the Internet, Intranet, Extranet, LAN, ISDN, VAN, CATV communication network, virtual private network, telecommunication network, mobile body communication network, satellite communication network etc. Further, a transmission medium for constituting the communication network is not particularly limited, and it may be wired based, such as IEEE1394, USB, power-line carrier, cable TV line, telephone line, ADSL line, or radio based, such as infrared medium such as IrDA, remote control, Bluetooth, 802.11 radio, HDR, mobile phone network, satellite communication line, ground wave digital network. Note that, the present invention may be realized in the form of a carrier wave, or a data signal line that realizes the program code by electronic transmission.

AS described, the control apparatus according to the present invention is configured to communicate with a multi-functional apparatus and control the multi-functional apparatus, and comprises: data processing means for acquiring, on input of a job execution instruction into the multi-functional apparatus, a process request corresponding to the job execution instruction from the multi-functional apparatus, and carrying out predetermined data processing corresponding to the process request; process result outputting means for outputting to the multi-functional apparatus a process result given by the data processing means; and controlling means for controlling the multi-functional apparatus to enable the multi-functional apparatus to accept a job execution instruction from another user during the data processing by the data processing means.

Further, a control method for a control apparatus according to the present invention is a control method for a control apparatus configured to communicate with a multi-functional apparatus and control the multi-functional apparatus, the control method comprising: by data processing means, acquiring, on input of a job execution instruction into the multi-functional apparatus, a process request corresponding to the job execution instruction from the multi-functional apparatus, and carrying out predetermined data processing corresponding to the process request; by process result outputting means, outputting to the multi-functional apparatus a process result given by the data processing means; and by controlling means, controlling the multi-functional apparatus to enable the multi-functional apparatus to accept a job execution instruction from another user during the data processing by the data processing means.

A multi-functional apparatus according to the present invention is a multi-functional apparatus connected to a control apparatus via a communication line, comprising: process request outputting means for outputting, on input of a job execution instruction, a process request corresponding to the job execution instruction to the control apparatus; and image outputting means for acquiring a process result of the data processing corresponding to the process request from the control apparatus and carrying out image output corresponding to the process result.

Further, a multi-functional apparatus control system according to the present invention includes a control apparatus and the multi-functional apparatus.

With this arrangement, the controlling means of the control apparatus controls the multi-functional apparatus to enable the multi-functional apparatus to accept a job execution instruction from another user in the course of the data processing by the control apparatus. Therefore, the multi-functional apparatus can accept a job execution instruction from a different user in the course of the data processing by the control apparatus. More specifically, the foregoing arrangement allows a user to input a job execution instruction to the multi-functional apparatus to start the job even when another user uses an application program of the control apparatus. Consequently, even when the job of the application program instructed by the previous user takes a while, the next user does not have to wait until the data processing is completed. This improves user convenience.

Further, the control apparatus according to the present invention is preferably arranged so that: the multi-functional apparatus stores (i) first user identification information for identifying a logged-in user, the data processing means acquires, together with the process request, (ii) second user identification information for identifying a user who inputted the job execution instruction corresponding to the process request, and the process result outputting means determines, when the data processing means has completed the data processing, whether (ii) the second user identification information acquired by the data processing means together with the process request coincides with (i) the first user identification information stored in the multi-functional apparatus, and in a case where the second user identification information coincides with the first user identification information, outputs the process result of the data processing to the multi-functional apparatus and causes the multi-functional apparatus to carry out a job corresponding to the process result.

With the foregoing arrangement, the process result of data processing is not transmitted while other logged-in user is accessing to the multi-functional apparatus 1. Therefore, the output image as a result of job execution corresponding to the process result will not be seen by other user. Therefore the user cannot mistakenly take away printed paper or the like resulted from an instruction by other user.

Also, after input of job execution instruction, the user can leave the multi-functional apparatus while the control apparatus is processing data. Then, the user can logs in the multi-functional apparatus again to acquire a process result corresponding to the job execution instruction from the control apparatus, causing the multi-functional apparatus to carry out a job corresponding to the process result. Therefore, it requires less time to keep the user waiting in front of the multi-functional apparatus.

Further, the control apparatus according to the present invention is preferably arranged so that: the multi-functional apparatus stores (i) first user identification information for identifying a logged-in user, the data processing means acquires, together with the process request, (ii) second user identification information for identifying a user who inputted the job execution instruction corresponding to the process request, and the process result outputting means determines, when the data processing means has completed the data processing, whether (ii) the second user identification information acquired by the data processing means together with the process request coincides with (i) the first user identification information stored in the multi-functional apparatus, and in a case where the second user identification information does not coincide with the first user identification information, suspends output of the process result of the data processing to the multi-functional apparatus.

With the foregoing arrangement, the process result of data processing is not transmitted while other logged-in user is accessing to the multi-functional apparatus 1. Therefore, the output image as a result of job execution corresponding to the process result will not be seen by other user. Therefore the user cannot mistakenly take away printed paper or the like resulted from an instruction by other user.

Further, the control apparatus according to the present invention is preferably arranged so that: the multi-functional apparatus stores (i) first user identification information for identifying a logged-in user, the data processing means acquires, together with the process request, (ii) second user identification information for identifying a user who inputted the job execution instruction corresponding to the process request, and the process result outputting means determines when the data processing means has completed the data processing, whether (ii) the second user identification information acquired by the data processing means together with the process request coincides with (i) the first user identification information stored in the multi-functional apparatus, and in a case where the second user identification information does not coincide with the first user identification information, outputs the process result of the data processing to the multi-functional apparatus and causes the multi-functional apparatus to carry out a job corresponding to the process result after at least a user indicated by the first user identification information logged out.

With the foregoing arrangement, the job based on the process result of data processing is not carried out while other logged-in user is accessing to the multi-functional apparatus 1. Therefore, the output image as a result of job execution corresponding to the process result will not be seen by other user. Therefore the user cannot mistakenly take away printed paper or the like resulted from an instruction by other user.

Further, the control apparatus according to the present invention is preferably arranged so that: the control apparatus includes a user identification information storage section for storing (i) first user identification information for identifying a logged-in user who is currently accessing to the multi-functional apparatus, the data processing means acquires, together with the process request, (ii) second user identification information for identifying a user who inputted the job execution instruction corresponding to the process request, and the process result outputting means determines, when the data processing means has completed the data processing, whether (ii) the second user identification information acquired by the data processing means together with the process request coincides with (i) the first user identification information stored in the user identification information storage section, and in a case where the second user identification information coincides with the first user identification information, outputs the process result of the data processing to the multi-functional apparatus and causes the multi-functional apparatus to carry out a job corresponding to the process result.

With the foregoing arrangement, the process result of data processing is not transmitted while other logged-in user is accessing to the multi-functional apparatus 1. Therefore, the output image as a result of job execution corresponding to the process result will not be seen by other user. Therefore the user cannot mistakenly take away printed paper or the like resulted from an instruction by other user.

Also, after input of job execution instruction, the user can leave the multi-functional apparatus while the control apparatus is processing data. Then, the user can longs in the multi-functional apparatus again to acquire a process result corresponding to the job execution instruction from the control apparatus, causing the multi-functional apparatus to carry out a job corresponding to the process result. Therefore, it requires less time to keep the user waiting in front of the multi-functional apparatus.

Further, the control apparatus according to the present invention is preferably arranged so that: the control apparatus includes a user identification information storage section for storing (i) first user identification information for identifying a logged-in user who is currently accessing to the multi-functional apparatus, the data processing means acquires, together with the process request, (ii) second user identification information for identifying a user who inputted the job execution instruction corresponding to the process request, and the process result outputting means determines, when the data processing means has completed the data processing, whether (ii) the second user identification information acquired by the data processing means together with the process request coincides with (i) the first user identification information stored in the user identification information storage section, and in a case where the second user identification information does not coincide with the first user identification information, suspends output of the process result of the data processing to the multi-functional apparatus.

With the foregoing arrangement, the process result of data processing is not transmitted while other logged-in user is accessing to the multi-functional apparatus 1. Therefore, the output image as a result of job execution corresponding to the process result will not be seen by other user. Therefore the user cannot mistakenly take away printed paper or the like resulted from an instruction by other user.

Further, the control apparatus according to the present invention is preferably arranged so that: the control apparatus includes a user identification information storage section for storing (i) first user identification information for identifying a logged-in user who is currently accessing to the multi-functional apparatus, the data processing means acquires, together with the process request, (ii) second user identification information for identifying a user who inputted the job execution instruction corresponding to the process request, and the process result outputting means determines, when the data processing means has completed the data processing, whether (ii) the second user identification information acquired by the data processing means together with the process request coincides with (i) the first user identification information stored in the user identification information storage section, and in a case where the second user identification information does not coincide with the first user identification information, outputs the process result of the data processing to the multi-functional apparatus and causes the multi-functional apparatus to carry out a job corresponding to the process result after at least a user indicated by the first user identification information logged out.

With the foregoing arrangement, the job based on the process result of data processing is not carried out while other logged-in user is accessing to the multi-functional apparatus 1. Therefore, the output image as a result of job execution corresponding to the process result will not be seen by other user. Therefore the user cannot mistakenly take away printed paper or the like resulted from an instruction by other user.

A multi-functional apparatus according to the present invention preferably further comprises displaying means for causing a display section to display a progress of a job corresponding to the job execution instruction for each user who inputted the job execution instruction.

This allows the user to visually confirm a progress of a job corresponding to the input job execution instruction.

Examples of the job progress include a state where the job is in the middle of processing by the control apparatus, and a state where, after the data processing by the control apparatus is completed, the process result is temporary stored in the multi-functional apparatus. If the display shows that the process result is temporarily stored, the user can input an instruction to restart the job corresponding to the process result temporary stored in the multi-functional apparatus. Further, the user can leave the multi-functional apparatus after he/she inputs the job execution instruction until the display shows that the process result is temporary stored. Therefore, it requires less time to keep the user waiting in front of the multi-functional apparatus.

The multi-functional apparatus according to the present invention further comprises user identification information identifying means for identifying user identification information which identifies a user. The user identification information identifying mean is constituted of either of a touch panel, an IC card information reading device, and a biological identification information reading device.

This enables the multi-functional apparatus to more easily identify the first user identification information, and the second user identification information.

The respective means of the control apparatus may be realized by hardware or by causing a computer to execute a program. More specifically, the control program according to the present invention is a program for causing a computer to function as the respective means of the control apparatus. A storage medium according to the present invention stores the control program.

In response to execution of the control program in a computer, the computer operates as the respective means of the control apparatus. The control program realizes a system capable of integratedly controlling the same functions as those of the control apparatus, and also flexibly changing these functions.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A control apparatus configured to communicate with a multi-functional apparatus and control the multi-functional apparatus, comprising:
   data processing means for acquiring, on input of a job execution instruction into the multi-functional apparatus, a process request corresponding to the job execution instruction from the multi-functional apparatus, and carrying out predetermined data processing corresponding to the process request;
   process result outputting means for outputting to the multi-functional apparatus a process result given by the data processing means; and
   controlling means for controlling the multi-functional apparatus to enable the multi-functional apparatus to accept a job execution instruction from another user during the data processing by the data processing means.

2. The control apparatus as set forth in claim 1, wherein:
   the multi-functional apparatus stores (i) first user identification information for identifying a logged-in user,
   the data processing means acquires, together with the process request, (ii) second user identification information for identifying a user who inputted the job execution instruction corresponding to the process request, and
   the process result outputting means determines, when the data processing means has completed the data processing, whether (ii) the second user identification information acquired by the data processing means together with the process request coincides with (i) the first user identification information stored in the multi-functional apparatus, and in a case where the second user identification information coincides with the first user identification information, outputs the process result of the data processing to the multi-functional apparatus and causes the multi-functional apparatus to carry out a job corresponding to the process result.

3. The control apparatus as set forth in claim 1, wherein:
   the multi-functional apparatus stores (i) first user identification information for identifying a logged-in user,
   the data processing means acquires, together with the process request, (ii) second user identification information for identifying a user who inputted the job execution instruction corresponding to the process request, and
   the process result outputting means determines, when the data processing means has completed the data processing, whether (ii) the second user identification information acquired by the data processing means together with the process request coincides with (i) the first user identification information stored in the multi-functional apparatus, and in a case where the second user identification information does not coincide with the first user identification information, suspends output of the process result of the data processing to the multi-functional apparatus.

4. The control apparatus as set forth in claim 1, wherein:
   the multi-functional apparatus stores (i) first user identification information for identifying a logged-in user,
   the data processing means acquires, together with the process request, (ii) second user identification information for identifying a user who inputted the job execution instruction corresponding to the process request, and
   the process result outputting means determines, when the data processing means has completed the data processing, whether (ii) the second user identification information acquired by the data processing means together with the process request coincides with (i) the first user identification information stored in the multi-functional apparatus, and in a case where the second user identification information does not coincide with the first user identification information, outputs the process result of the data processing to the multi-functional apparatus and causes the multi-functional apparatus to carry out a job corresponding to the process result after at least a user indicated by the first user identification information logged out.

5. The control apparatus as set forth in claim 1, wherein:
   the control apparatus includes a user identification information storage section for storing (i) first user identification information for identifying a logged-in user who is currently accessing to the multi-functional apparatus,
   the data processing means acquires, together with the process request, (ii) second user identification information for identifying a user who inputted the job execution instruction corresponding to the process request, and
   the process result outputting means determines, when the data processing means has completed the data processing, whether (ii) the second user identification information acquired by the data processing means together with the process request coincides with (i) the first user identification information stored in the user identification information storage section, and in a case where the second user identification information coincides with the first user identification information, outputs the process result of the data processing to the multi-functional apparatus and causes the multi-functional apparatus to carry out a job corresponding to the process result.

6. The control apparatus as set forth in claim 1, wherein:
   the control apparatus includes a user identification information storage section for storing (i) first user identification information for identifying a logged-in user who is currently accessing to the multi-functional apparatus,
   the data processing means acquires, together with the process request, (ii) second user identification information for identifying a user who inputted the job execution instruction corresponding to the process request, and
   the process result outputting means determines, when the data processing means has completed the data processing, whether (ii) the second user identification information acquired by the data processing means together with the process request coincides with (i) the first user identification information stored in the user identification information storage section, and in a case where the second user identification information does not coincide with the first user identification information, suspends output of the process result of the data processing to the multi-functional apparatus.

7. The control apparatus as set forth in claim 1, wherein:
   the control apparatus includes a user identification information storage section for storing (i) first user identification information for identifying a logged-in user who is currently accessing to the multi-functional apparatus,
   the data processing means acquires, together with the process request, (ii) second user identification information for identifying a user who inputted the job execution instruction corresponding to the process request, and
   the process result outputting means determines, when the data processing means has completed the data processing, whether (ii) the second user identification information acquired by the data processing means together with the process request coincides with (i) the first user identification information stored in the user identification information storage section, and in a case where the second user identification information does not coincide with the first user identification information, outputs the process result of the data processing to the multi-functional apparatus and causes the multi-functional apparatus to carry out a job corresponding to the process result after at least a user indicated by the first user identification information logged out.

8. A multi-functional apparatus connected to a control apparatus via a communication line,
the control apparatus being configured to communicate with the multi-functional apparatus and control the multi-functional apparatus,
the control apparatus comprising:
data processing means for acquiring, on input of a job execution instruction into the multi-functional apparatus, a process request corresponding to the job execution instruction from the multi-functional apparatus, and carrying out predetermined data processing corresponding to the process request;
process result outputting means for outputting to the multi-functional apparatus a process result given by the data processing means; and
controlling means for controlling the multi-functional apparatus to enable the multi-functional apparatus to accept a job execution instruction from another user during the data processing by the data processing means,
the multi-functional apparatus comprising:
process request outputting means for outputting, on input of a job execution instruction, a process request corresponding to the job execution instruction to the control apparatus; and
image outputting means for acquiring a process result of the data processing corresponding to the process request from the control apparatus and carrying out image output corresponding to the process result.

9. The multi-functional apparatus as set forth in claim 8, further comprising displaying means for causing a display section to display a progress of a job corresponding to the job execution instruction for each user who inputted the job execution instruction.

10. The multi-functional apparatus as set forth in claim 8, further comprising user identification information identifying means for identifying user identification information which identifies a user.

11. The multi-functional apparatus as set forth in claim 10, wherein the user identification information identifying mean is constituted of either of a touch panel, an IC card information reading device, and a biological identification information reading device.

12. A multi-functional apparatus control system comprising
a control apparatus and a multi-functional apparatus,
the control apparatus being configured to communicate with the multi-functional apparatus and control the multi-functional apparatus
the multi-functional apparatus being connected to the control apparatus via a communication line,
the control apparatus comprising:
data processing means for acquiring, on input of a job execution instruction into the multi-functional apparatus, a process request corresponding to the job execution instruction from the multi-functional apparatus, and carrying out predetermined data processing corresponding to the process request;
process result outputting means for outputting to the multi-functional apparatus a process result given by the data processing means; and
controlling means for controlling the multi-functional apparatus to enable the multi-functional apparatus to accept a job execution instruction from another user during the data processing by the data processing means,
the multi-functional apparatus comprising:
process request outputting means for outputting, on input of a job execution instruction, a process request corresponding to the job execution instruction to the control apparatus; and
image outputting means for acquiring a process result of the data processing corresponding to the process request from the control apparatus and carrying out image output corresponding to the process result.

13. A control program for controlling a control apparatus, the control apparatus being configured to communicate with a multi-functional apparatus and control the multi-functional apparatus and comprising:
data processing means for acquiring, on input of a job execution instruction into the multi-functional apparatus, a process request corresponding to the job execution instruction from the multi-functional apparatus, and carrying out predetermined data processing corresponding to the process request;
process result outputting means for outputting to the multi-functional apparatus a process result given by the data processing means; and
controlling means for controlling the multi-functional apparatus to enable the multi-functional apparatus to accept a job execution instruction from another user during the data processing by the data processing means,
the control program causing a computer to function as the respective means of the control apparatus.

14. A computer-readable storage medium which stores a control program for controlling a control apparatus,
the control apparatus being configured to communicate with a multi-functional apparatus and control the multi-functional apparatus and comprising:
data processing means for acquiring, on input of a job execution instruction into the multi-functional apparatus, a process request corresponding to functional apparatus, and carrying out predetermined data processing corresponding to the process request;
process result outputting means for outputting to the multi-functional apparatus a process result given by the data processing means; and
controlling means for controlling the multi-functional apparatus to enable the multi-functional apparatus to accept a job execution instruction from another user during the data processing by the data processing means,
the control program causing a computer to function as the respective means of the control apparatus.

15. A control method for a control apparatus configured to communicate with a multi-functional apparatus and control the multi-functional apparatus,
the control method comprising:
by data processing means, acquiring, on input of a job execution instruction into the multi-functional apparatus, a process request corresponding to the job execution instruction from the multi-functional apparatus, and carrying out predetermined data processing corresponding to the process request;
by process result outputting means, outputting to the multi-functional apparatus a process result given by the data processing means; and the data processing by the data processing means.

* * * * *